United States Patent
Hoshino et al.

(10) Patent No.: US 7,239,304 B2
(45) Date of Patent: Jul. 3, 2007

(54) POINTING DEVICE AND PORTABLE INFORMATION TERMINAL USING THE SAME

(75) Inventors: Takeshi Hoshino, Kodaira (JP); Yukinobu Maruyama, Kokubunji (JP); Yukinori Asada, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 784 days.

(21) Appl. No.: 09/930,207

(22) Filed: Aug. 16, 2001

(65) Prior Publication Data

US 2002/0030668 A1 Mar. 14, 2002

(30) Foreign Application Priority Data

Aug. 21, 2000 (JP) .............................. 2000-249883

(51) Int. Cl.
G09G 5/00 (2006.01)

(52) U.S. Cl. ...................................... 345/175; 345/157

(58) Field of Classification Search ................ 345/156, 345/157, 158, 159, 160, 168, 169, 173, 175, 345/176; 178/18.03, 18.09, 18.11
See application file for complete search history.

(56) References Cited

U.S. PATENT DOCUMENTS 6,166,370 A * 12/2000 Sayag ......................... 250/221

FOREIGN PATENT DOCUMENTS

| JP | 05073201 | 3/1993 |
|---|---|---|
| JP | 05265656 | 10/1993 |
| JP | 07057103 | 3/1995 |
| JP | 7219702 | 8/1995 |
| JP | 8179878 | 7/1996 |
| JP | 11194872 | 7/1999 |
| WO | 0016244 | 3/2000 |

* cited by examiner

*Primary Examiner*—Chanh Nguyen
(74) *Attorney, Agent, or Firm*—Mattingly, Stanger, Malur & Brundidge, P.C.

(57) ABSTRACT

A pointing device is placed in a through hole provided on an outer case of the portable information terminal. The portable information terminal includes a fingerplate attached to a through hole via a hinge 4e; an image pick-up element placed on a circuit board; a condensing lens that forms an image on an outer surface of the fingerplate on an image pick-up plane of the image pick-up element; and a light emitting device that irradiates the outer surface of the fingerplate with illumination light, and takes the image of a pattern such as a fingerprint of a fingertip that touches the outer surface of the fingerplate by using the image pick-up element. When the fingertip moves while touching the fingerplate, the image taken by the image pick-up element changes and the pointer displayed on a display screen is moved in a direction according to a change direction and by a distance corresponding to a quantity of change.

11 Claims, 20 Drawing Sheets

EXAMPLE OF FINGERPLATE

FIG. 8A
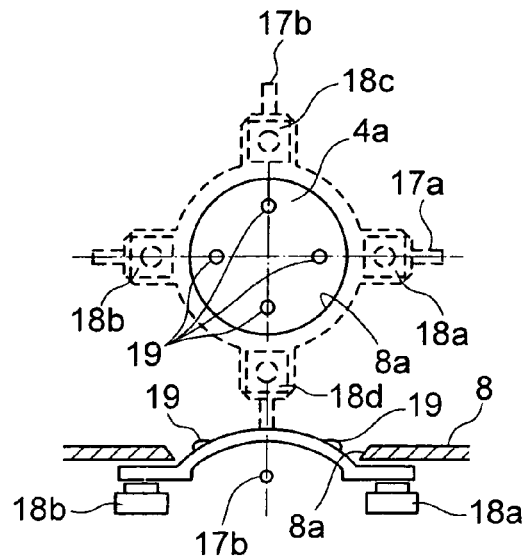
FIG. 8B
FIG. 8C
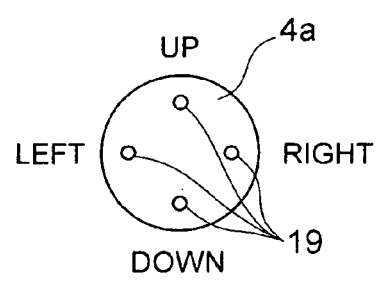
FIG. 8D
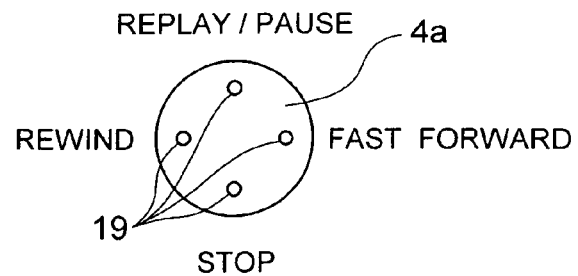

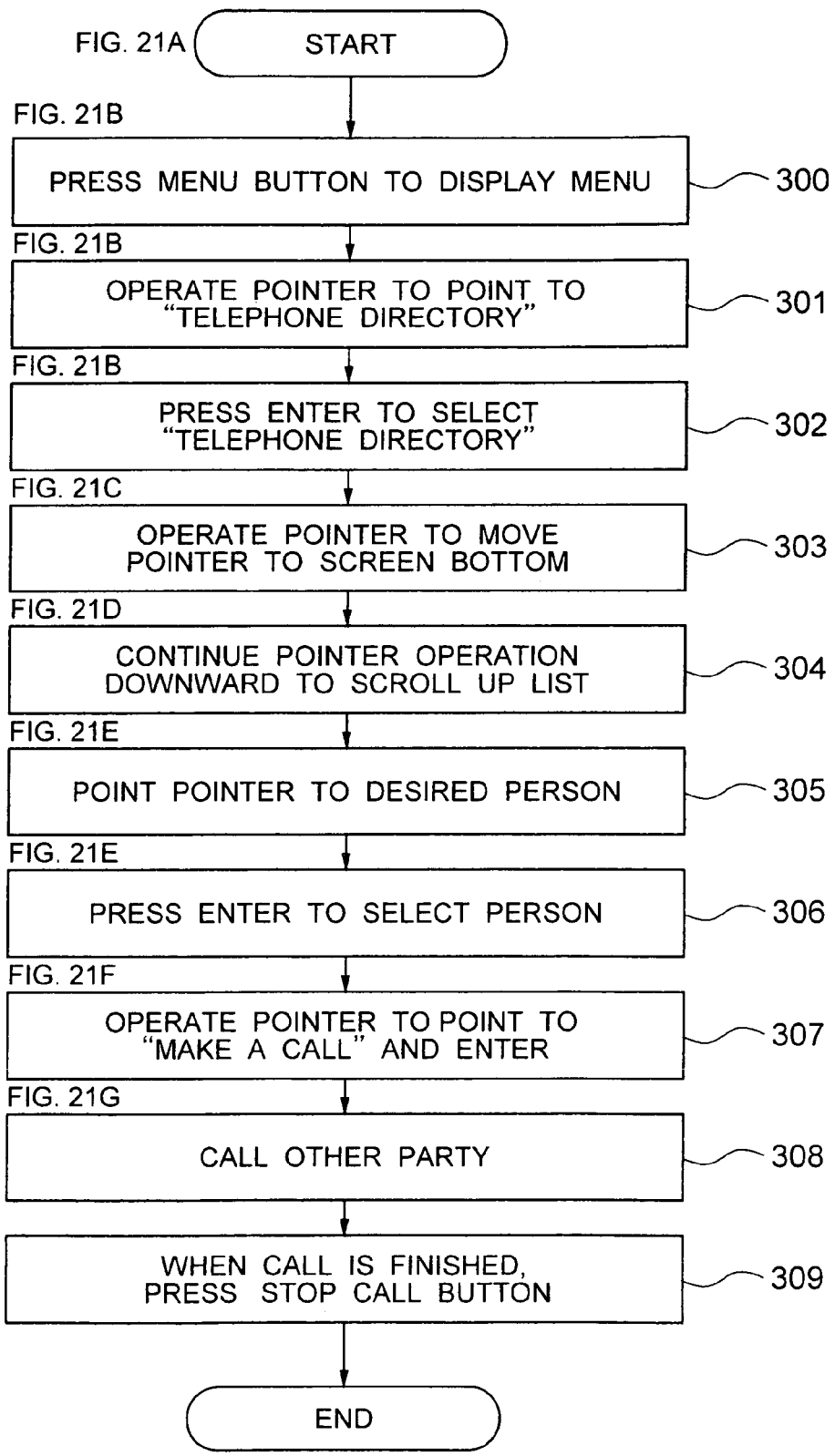

POINTING DEVICE AND PORTABLE INFORMATION TERMINAL USING THE SAME

BACKGROUND OF THE INVENTION

The present invention relates to a pointing device for moving a pointer (cursor) on a display screen used for a portable information terminal such as a cellular phone, and a portable information terminal using the pointing device.

Conventionally, a portable information terminal such as a portable type personal computer and cellular phone has an operation panel provided with a display screen on which a pointer for pointing to a desired position of an image is displayed and a pointing device for moving this pointer to a desired position.

As such a conventional pointing device, a track ball that moves a pointer by detecting the rotation of a ball and a dial type pointer that moves a pointer by detecting the rotation of a disk are known. Furthermore, as portable information terminals are being increasingly implemented with multi-functions and large-sized display screen, and in order to make it possible to arbitrarily and smoothly select more selection items with a pointer, a cross pointer having independent feed switches for upward/downward, rightward/leftward movements of a pointer and a stick pointer used for a game machine in particular that moves a pointer by tilting a stick or disk back and forth, right and left are also known. Furthermore, as used for a personal computer, etc., to continuously move a pointer on an image such as a map displayed on a display screen, a pointing device called a "track pad" is also known which consists of a flat table shaped sensor plate with a certain area and when a finger is moved continuously on this sensor plate, the continuously changing position of the finger is detected and the pointer is moved continuously according to this detection result.

On the other hand, since a portable information terminal must meet the need for portability, there is a demand for a smaller, lighter or thinner terminal. For the track ball or dial type pointing device above, meeting this demand is difficult because this pointing device includes a physical movable section such as a ball or disk, which puts a limit to reduction of the size.

With the pointing device such as the cross pointer and stick pointer above, the pointer basically moves one step by one operation, that is, the pointer moves by one item displayed on the display screen at a time, and therefore selecting an item at a considerable distance on the display screen requires more operations, which takes time and trouble.

Moreover, the track pad described above moves the pointer by touching the sensor plate with the finger and therefore the sensor plate must have an area sufficiently greater than the area of the finger that touches this and is not suited to miniaturization.

SUMMARY OF THE INVENTION

It is an object of the present invention to provide a pointing device capable of being small-sized and facilitating movement of the pointer, and a portable information terminal using such a pointing device.

In order to attain the above object, the pointing device according to the present invention includes a transparent plate having an outer surface to contact the surface of an object, image detecting means for detecting an image of the surface of the object that contacts the outer surface of the plate and optical means for forming an image on the outer surface of the plate on the detection plane of the image detecting means, in which the pointer is configured to be able to move according to the movement of the image on the outer surface of the plate detected by said image detecting means.

Furthermore, the portable information terminal according to the present invention is provided with the above-described pointing device and comprises means for detecting the movement of the image detected by the image detecting means and moving the pointer in the direction according to the direction of the detected movement.

When the user puts the finger on the plate and moves the finger from that position, the above configuration allows the fingerprint of this fingertip to be detected as a moving image and allows the pointer on the display screen to move in the direction according to the direction of this movement. This prevents the user from operating different operation switches according to the moving direction of the pointer and makes the operation easier. Moreover, the user only needs to detect the movement of the image on the plate, and therefore it is possible to narrow the range of image detection and reduce the size of the pointing device.

Furthermore, the portable information terminal according to the present invention provided with the above-described pointing device comprises means for determining the presence/absence of movement of the image on the outer surface of the plate detected by the image detecting means and switching the sensing frequency of the image detecting means according to the determination result.

When there is no movement of the image on the outer surface of the plate and no pointer movement operation, the above configuration makes it possible to reduce the sensing frequency of the image detecting means and suppress power consumption of the image detecting means accordingly.

In order to attain the above object, the pointing device according to the present invention further includes light emitting means for emitting light onto the outer surface of said plate in addition to the above configuration.

Furthermore, the portable information terminal according to the present invention is provided with the above-described pointing device and comprises first means for measuring a reflection factor of the plate on the outer surface from the quantity of light received of the image detecting means and the quantity of light emitted of the light emitting means, second means for designating the quantity of light emitted of the light emitting means as a first reference value when the reflection factor measured by the first means falls below a predetermined minimum reference value and adjusting the quantity of light emitted of the light emitting means when the reflection factor measured by the first means exceeds the minimum reference value so that the quantity of light received by the image detecting means becomes a predetermined second reference value which is larger than the first reference value, third means for detecting the movement of the image detected by the image detecting means and moving the pointer in the direction according to the direction of said detected movement and fourth means for determining the presence/absence of movement of the image detected by the image detecting means, setting the pointing device in an action mode when the movement is detected, moving the pointer in the direction according to the direction of the movement and setting the pointing device in a standby mode when the movement is not detected for a predetermined period of time, wherein the sensing frequency of the pointing device in the standby mode is smaller than the sensing frequency of the pointing device in the action mode.

Furthermore, the second means changes temporarily the quantity of light emitted of the light emitting means when the reflection factor measured by the first means falls below a predetermined minimum reference value and designates the quantity of light emitted of the light emitting means as the predetermined first reference value when the quantity of light received of the image detecting means does not change as the quantity of light emitted changes.

According to the configuration above, the light emitting means illuminates the image on the outer surface of the plate and the image detecting means can detect an image of high brightness and when no pointer movement operation is carried out without touching the outer surface of the plate with the fingertip, etc., this can be detected, which can suppress the quantity of light emitted by the light emitting means as standby mode and allows power saving. Moreover, whether the fingertip, etc. is touching the outer surface of the plate or not is judged from the reflection factor of the image on the outer surface of the plate and further a variation of the quantity of light received of the image detecting means is detected by temporarily changing the quantity of light emitted of the light emitting means, and therefore whether the fingertip, etc. is touching the outer surface of the plate or not can be judged more accurately. This configuration can provide detection of an image with necessary and sufficient brightness without being affected by personal differences such as the color of the fingertip or differences from one part to another, and even if the user wears gloves, this configuration can provide detection of an image with necessary and sufficient brightness without being affected by differences in color or material.

Furthermore, the portable information terminal according to the present invention in the above configuration allows the pointing device to push the plate and is provided with at least one operation switch that operates in accordance with this pushing operation and one of these operation switches is designated as an "ENTER" switch to enter the menu on the display screen indicated by the pointer.

Such a configuration allows the pointing device to have multi-functions, makes it possible to reduce the number of operation switches on the operation panel of the portable information terminal, further reduce the size of the portable information terminal, and add new operation switches enhancing the multi-functions of the portable information terminal.

Furthermore, the portable information terminal according to the present invention in the above configuration is configured so that the optical means of the pointing device can change the focal distance of the condensing lens.

Such a configuration allows the portable information terminal according to the present invention to also have functions as a digital camera or video camera.

BRIEF DESCRIPTION OF THE DRAWINGS

FIGS. 8A, 8B, 8C, 8D are configuration diagrams showing a further embodiment of the pointing device according to the present invention;

FIG. 20 is a flow chart showing a specific example of an operation procedure for making a call with the embodiment of the portable information terminal according to the present invention;

DESCRIPTION OF THE EMBODIMENTS

With reference now to the attached drawings, embodiments of the present invention will be explained below.

Figure 1:
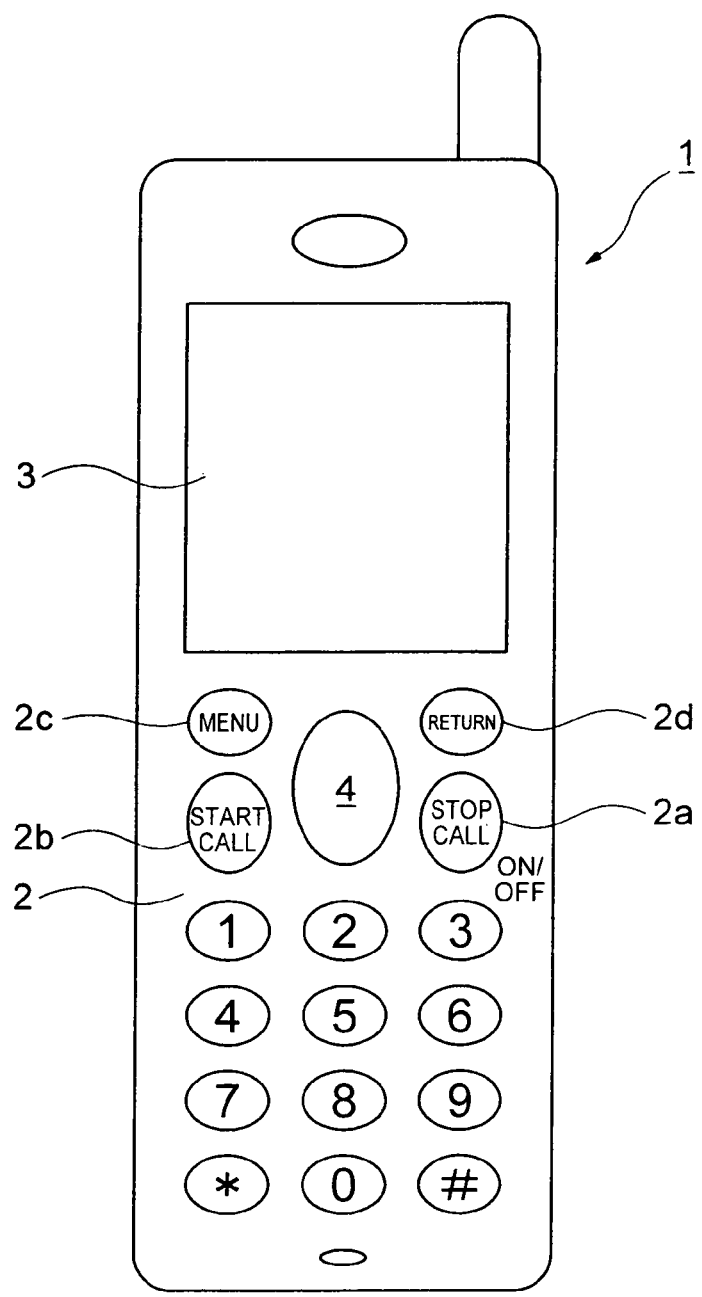
FIG. 1 is a front view showing an embodiment of a portable information terminal according to the present invention.

FIG. 1 is a front view showing an embodiment of a portable information terminal using a pointing device according to the present invention. Reference numeral 1 denotes a portable information terminal; 2, an operation panel; 2a, a "Power/stop call" button; 2b, "Start call" button; 2c, a "Menu" button; 2d, a "Return" button; 3, a display screen; 4, a pointing device. Here, this embodiment shows a case of a cellular phone, but this embodiment can also be other portable information terminals such as a portable type personal computer.

In the same drawing, the operation panel 2 including various operation components such as the pointing device 4 and the display screen 3 that shows an image and pointer (cursor, not shown) are provided on the front of the portable information terminal 1. The operation panel 2 is provided with the "Power/stop call" button 2a to indicate the power button and the end of a call, "the Start call" button 2b to indicate the start of a call, the "Menu" button 2c to display the menu screen on the display screen 3, the "Return" button 2d to return to the screen displayed just before on the display screen 3 and a ten-key pad which can also be used to enter characters, etc.

The pointer displayed on the display screen 3 can be moved by stroking the surface of the pointing device 4 on the operation panel 2 with a fingertip. The pointing device 4 is also provided with an enter function which is not shown and pressing this pointing device 4 with the fingertip activates this enter function to enter an item indicated by the pointer on the display screen 3 or touch button, etc.

Figure 2A:
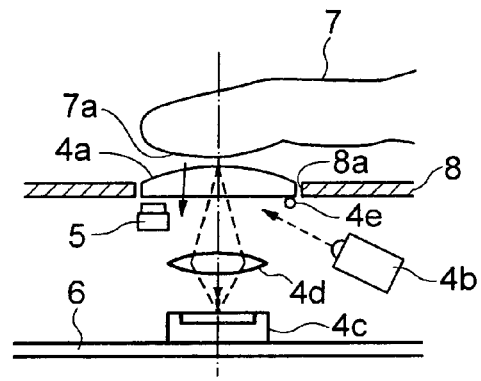
FIGS. 2A, 2B are configuration diagrams showing an embodiment of a pointing device according to the present invention.
Figure 2B:
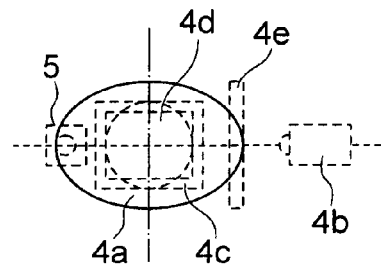

FIG. 2 shows an embodiment of the pointing device 4 according to the present invention used for the portable information terminal shown in FIG. 1 and FIG. 2A is a vertical cross-sectional view and FIG. 2B is a top view to see through the pointing device 4 and reference numeral 4a denotes a fingerplate; 4b, a light emitting device; 4c, an image pick-up element; 4d, a condensing lens; 4e, a hinge; 5, "ENTER" switch, 6, a circuit board; 7, a fingertip; 7a, the thick of the fingertip; 8, an outer case of the portable information terminal 1, 8a, a through hole perforated in the outer case 8.

By the way, the top surface of the outer case 8 in FIG. 2A is an outside of the portable information terminal 1.

In FIG. 2A and FIG. 2B, the fingerplate 4a, light emitting device 4b, image pick-up element 4c, condensing lens 4d and hinge 4e constitute the pointing device 4 in FIG. 1 and the transparent fingerplate 4a of these components is fitted in the through hole 8a perforated in the outer case 8 on the operation panel 2 (FIG. 1) side of the portable information terminal 1. This fingerplate 4a has a convex outer surface (that is, the surface of the fingertip 7 shown in the figure) and sticks out of the outer surface of the outer case 8 and can be easily touched by the thick 7a of the fingertip 7. Furthermore, one end of this fingerplate 4a is supported by the hinge 4e and set in such a way as to be pivotable centered on the hinge 4e in the direction shown by the arrow. This fingerplate 4a can be pushed in the outer case 8 (that is, inside the portable information terminal 1) by the fingertip 7. When the pushing by the fingertip 7 is released, the fingerplate 4a is returned to its original position shown in the figure by restoring means such as a spring (not shown).

Inside the outer case 8, the light emitting device 4b, condensing lens 4d and image pick-up element 4c are provided. The image pick-up element 4c is fixed to the circuit board 6 inside the outer case 8. The normal in the center of the image pick-up surface of this image pick-up element 4c, the optical axis of the condensing lens 4d and the central axis of the fingerplate 4a almost coincide and the condensing lens 4d is placed in such a way that the image of the object on the outer surface of the fingerplate 4a is focused on the image pick-up surface of the image pick-up element 4c. Furthermore, the light emitting device 4b irradiates diagonally the outer surface of the fingerplate 4a from the inside of the outer case 8. Therefore, when there is nothing on the outer surface of the fingerplate 4a, the light beam from the light emitting device 4b passes through the fingerplate 4a and goes out of the portable information terminal 1, but if the thick 7a of the fingertip 7 touches the outer surface of the fingerplate 4a, the light beam from the light emitting device 4b illuminates this thick 7a and part of the reflected light is collected by the image pick-up element 4c via the condensing lens 4d. In this way, when the pattern of the surface of an object that touches the fingerplate 4a, for example, when the thick 7a of the fingertip 7 touches the fingerplate 4a, the image of the finger print is taken by the image pick-up element 4c. The image pick-up area of this image pick-up element 4c on the fingerplate 4a is part of the area such as the central area of the fingerplate 4a, and therefore an image of part of the area of the thick 7a of the fingertip 7 that touches the fingerplate 4a is picked up.

Thus, when the light beam is applied diagonally to the surface of an object that touches the fingerplate 4a, if the pattern of this surface of the object is a pattern made up of projections and depressions such as the finger print of the fingertip 7, the variations of light and shade produced by this light beam becomes further noticeable and an image with a more distinctive pattern is picked up by the image pick-up element 4c.

Furthermore, as shown above, by pushing the fingerplate 4a with the fingertip 7 in the direction shown by the arrow, the fingerplate 4a touches and activates the "ENTER" switch 5 to carry out an enter operation, which will be described later.

FIG. 3 is a block diagram showing another specific example of the illuminating means of the pointing device 4 shown in FIG. 2 and reference numerals $4f$, $4f_1$ and $4f_2$ denote optical path changing means and the same parts as those in FIG. 2 are assigned the same reference numerals and overlapping explanations will be omitted.

Figure 3A:
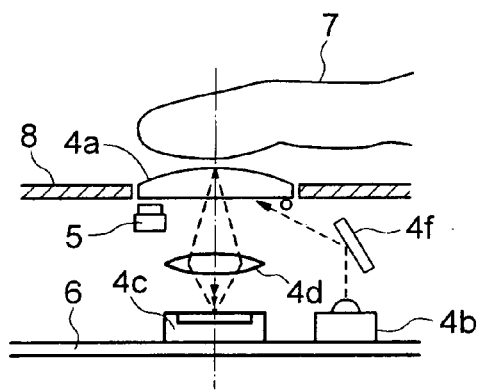
FIGS. 3A, 3B are configuration diagrams showing another specific example of illuminating means of the pointing device shown in FIG. 2.

A specific example shown in FIG. 3A describes a case where the light emitting device 4b is placed on the circuit board 6 face up (that is, the outgoing illumination beam is oriented perpendicular to the plane of the circuit board 6) and the illumination beam is emitted in the direction perpendicular to the plane of the circuit board 6. Then, the optical path changing means $4f$ made up of a mirror or prism is provided between this light emitting device 4b and the outer case 8 so that the optical path changing means $4f$ changes the optical path of the illumination beam output from the light emitting device 4b and the fingerplate 4a is irradiated with this illumination beam diagonally from the lower part.

Figure 3B:
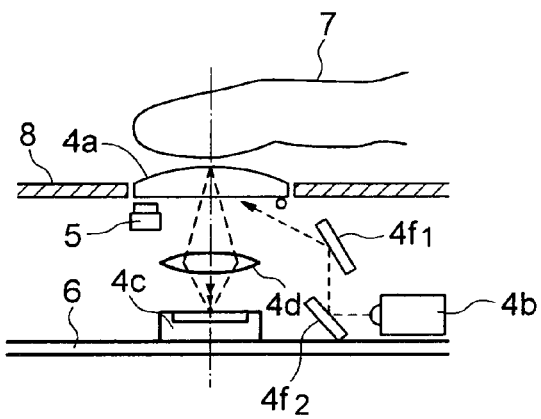

A specific example shown in FIG. 3B describes a case where the light emitting device 4b is placed on its side on the circuit board 6 (that is, the outgoing beam is oriented parallel to the surface of the circuit board 6) and the illumination beam is emitted in the direction parallel to the surface of the circuit board 6. Moreover, on the circuit board 6 an optical path changing means $4f_1$ made up of a mirror or prism is provided facing the light emission port of this light emitting device 4b and an optical path changing means $4f_2$ made up of a mirror or prism is provided facing the optical path changing means $4f_1$ between the circuit board 6 and outer case 8 so that the light path of the illumination beam output from the light emitting device 4b is changed by these optical path changing means $4f_1$ and $4f_2$ and the fingerplate 4a is irradiated with this illumination beam diagonally from below.

Thus, placing the light emitting device 4b, which is an electronic part, on the same circuit board as that of the image pick-up element 4c can simplify wiring support parts, etc., reduce manufacturing cost and shorten the operation time.

FIG. 4 is a configuration diagram showing another layout of the fingerplate 4a of the pointing device 4 shown in FIG. 2 and the same parts as those in FIG. 2 are assigned the same reference numerals and overlapping explanations will be omitted.

Figure 4A:
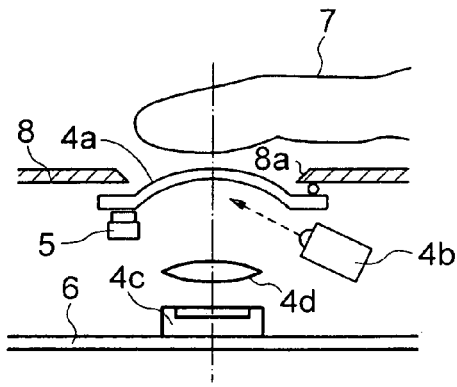
FIGS. 4A, 4B are configuration diagrams showing another layout example of a fingerplate of the pointing device shown in FIG. 2.

The specific example shown in FIG. 4A is configured to allow the fingerplate 4a to be placed inside the outer case 8. In this case, the entire fingerplate 4a can be placed inside the outer case 8 or the fingerplate 4a can be placed so that the central part of the convex outer surface of the fingerplate 4a is placed inside the through hole 8a of the outer case 8 or the central part of the convex outer surface of the fingerplate 4a sticks out of this through hole 8a.

In this case, the distance between the fingerplate 4a and circuit board 6 becomes shorter, and therefore it is possible to increase the above distance by making the thickness of the fingerplate 4a almost uniform and make the inner surface side have a concave shape.

Figure 4B:
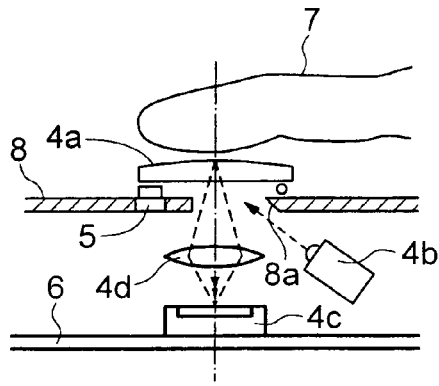

The specific example shown in FIG. 4B is configured in such a way that the fingerplate 4a is placed outside the outer case 8. In this case, the "ENTER" switch 5 is also mounted on the outer case 8 so that at least the operation part pressed by the fingerplate 4a also comes outside the outer case 8.

FIG. 5 is a perspective view showing specific examples of configurations of the outer surface of the fingerplate 4a shown in FIG. 2 to FIG. 4. Here, the fingerplate 4a has a true circle shape, but the present invention is not limited to this and any surface shape can be taken such as ellipsoidal, rectangular or other shapes.

Figure 5A:
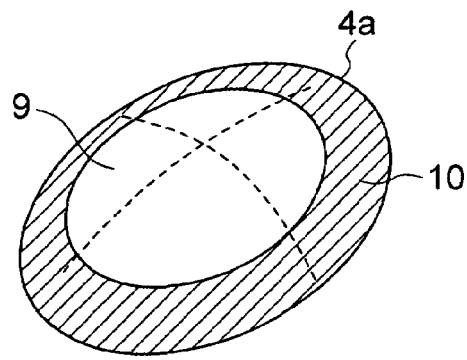
FIGS. 5A, 5B, 5C, 5D, 5E, 5F are perspective views showing a specific example of a configuration of an outer surface of the fingerplate shown in FIG. 2 to FIG. 4.

The specific example shown in FIG. 5A shows the fingerplate 4a whose outer region is made up of an opaque outline section 10 and has a transparent section 9 inside this outline section 10 as the area through which light passes. The image pick-up element 4c (FIG. 2) uses a predetermined area of this transparent section 9 as the image pick-up area. Such outline section 10 can reduce unnecessary incident light toward the image pick-up surface of the image pick-up element 4c from outside.

Figure 5D:
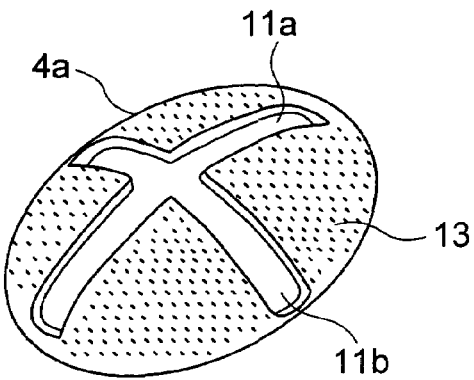
Figure 5B:
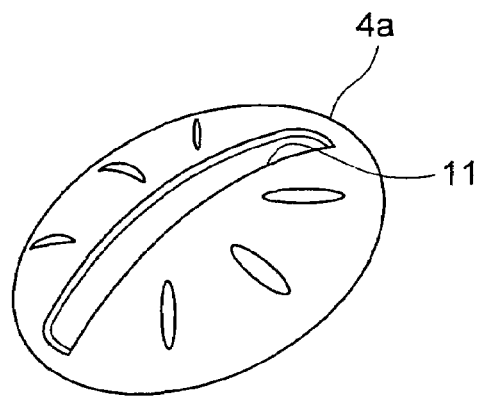

The specific example shown in FIG. 5B shows the fingerplate 4a with a shallow groove-like guide 11 provided in the radial direction passing its center, which makes it easier to move the fingertip 7 (FIG. 2) while touching the fingerplate 4a. It is this central part within this guide 11 that is the image pick-up area of the image pick-up element 4c and the area outside this image pick-up area can be opaque.

Figure 5E:
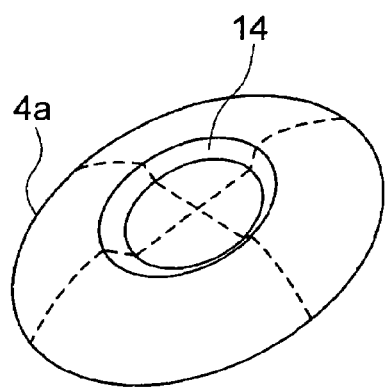
Figure 5C:
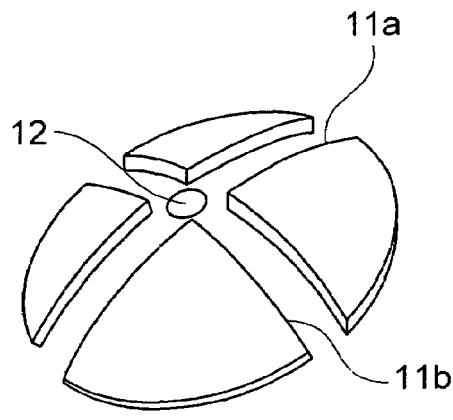

The specific example above is the case where the guide 11 is provided only in one direction, but as shown in FIG. 5C, it is also possible to provide two guides 11a and 11b, which intersect at right angles. In this case, the image pick-up area 12 of the image pick-up element 4c is set at the intersection of these guides 11a and 11b.

The specific example shown in FIG. 5D shows the specific example in FIG. 5C with guides 11a and 11b further finished with a gloss and the other area 13 leather-grained. Applying leather-graining to this area 13 has an effect of making it easier to slide the finger and preventing sweat from sticking to the surface.

Figure 5F:
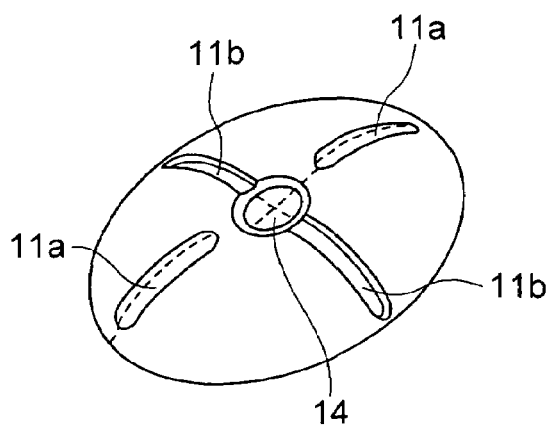

The specific example shown in FIG. 5E shows a case where a hollow section 14 is provided in the center of the outer surface of the fingerplate 4a and the image pick-up area of the image pick-up element 4c is set within this hollow section 14. Setting the image pick-up area of the image pick-up element 4c within this hollow section 14 in this way prevents other objects from touching this image pick-up area and prevents this image pick-up area from being damaged when the portable information terminal 1 is put in, for example, a briefcase. In this specific example, it is also possible to make the area outside the hollow section 14 opaque or as shown in FIG. 5F, provide guides 11a and 11b similar to those in FIG. 5C or as in the case of the specific example in FIG. 5D, finish guides 11a and 11b and hollow section 14 with a gloss and apply leather-graining to the other area.

FIG. 6 illustrates another specific example of the operating means of the "ENTER" switch 5 shown in FIG. 2 and the same parts as those in FIG. 2 are assigned the same reference numerals and overlapping explanations thereof will be omitted.

Figure 6A:
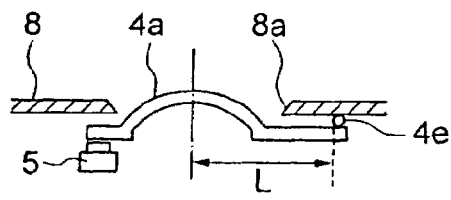
FIGS. 6A, 6B are configuration diagrams showing-another specific example of the "ENTER" switch operating means shown in FIG. 2.

The specific example shown in FIG. 6A shows a case where the fingerplate 4a is attached to the inner surface of the outer case 8 via the hinge 4e at a sufficiently large distance from the through hole 8a provided in the outer case 8. This makes it possible to increase a distance L between the position on the fingerplate 4a pressed by the fingertip to carry out an ENTER operation and the position at which this fingerplate 4a is attached to the outer case 8 and realize a motion close to a pushing operation in the vertical direction though it is actually an arc-shaped motion centered on the hinge 4e.

Figure 6B:
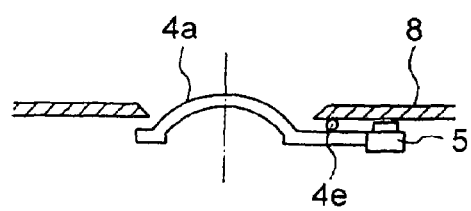

The specific example shown in FIG. 6B shows a case where the fingerplate 4a is attached to the inner surface of the outer case 8 via the hinge 4e at a position close to the through hole 8a provided in the outer case 8 and at the same time this fingerplate 4a extends beyond the position at which the fingerplate 4a is attached via this hinge 4e and the "ENTER" switch 5 is provided on the line of this extension. According to this configuration, when the fingerplate 4a is pressed by the fingertip, the "ENTER" switch 5 is lifted centered on the mounting section via the hinge 4e and the operating part thereof is pressed against the inner surface of the outer case 8 to perform an ENTER operation. In this case, the ENTER operation can be performed with a smaller force by applying the principle of leverage though this depends on a positional relationship between the hinge 4e and the "ENTER" switch 5.

Figure 7A:
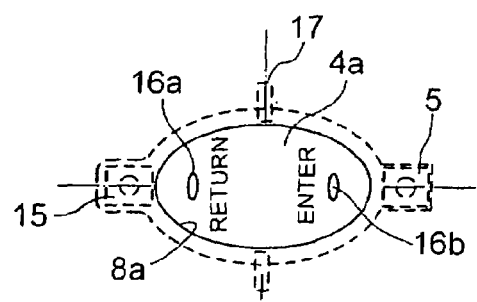
FIGS. 7A and 7B are configuration diagrams showing another embodiment of the pointing device according to the present invention.
Figure 7B:
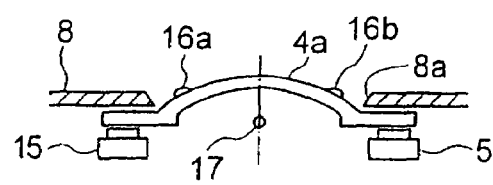

FIG. 7 is a configuration diagram showing another embodiment of the pointing device 4 according to the present invention. FIG. 7A is a top view and FIG. 7B is a cross-sectional view. Reference numeral 15 denotes a "RETURN" switch, 16a and 16b denote protrusions and reference numeral 17 denotes a rotation axis. The same parts as those in the above-described figures are assigned the same reference numerals and overlapping explanations thereof will be omitted.

This embodiment describes a case where the pointing device 4 described in FIG. 2 to FIG. 4 is provided with enhanced multi-functions.

In FIG. 7A and FIG. 7B, the "ENTER" switch 5 and "RETURN" switch 15 are placed inside the outer case 8 with the through hole 8a placed in between and protruding pressing sections are formed toward the switches 5 and 15 on the fingerplate 4a. The fingerplate 4a is placed by mounting means (not shown) in such a way as to be pivotable centered on the rotation axis 17. Here, the rotation axis 17 is perpendicular to the straight line connecting the "ENTER" switch 5 and "RETURN" switch 15. Of course, the mounting means above is made of a transparent material or provided in such a way as to bypass the image pick-up area so as not to prevent the image pickup element 4c (FIG. 2) from picking up an image on the outer surface of the fingerplate 4a. Furthermore, a protrusion 16a and a protrusion 16b are provided toward the "RETURN" switch 15 and toward the "ENTER" switch 5 of the outer surface of the fingerplate 4a, respectively. The image pick-up area of the image pick-up element 4c on the outer surface of this fingerplate 4a is the central part between the protrusions 16a and 16b on this outer surface.

When the pointing device 4 is provided with the "RETURN" function, providing the operation panel 2 with the "RETURN" switch 2d as shown in FIG. 1 is not a necessary condition though doing so is not objected.

With this pointing device 4 in such a configuration, the image in the image pick-up area on the outer surface of the fingerplate 4a is taken by the image pick-up element 4c and pushing in the "ENTER" switch 5 of this fingerplate 4a with the fingertip causes the protruding pressing section of this fingerplate 4a to press and activate this "ENTER" switch 5 to carry out an ENTER operation. In this case, the fingertip is stopped by the protrusion 16b, which makes it easier to push in the "ENTER" switch 5 of the fingerplate 4a. Moreover, by pushing in the "RETURN" switch 15 of this fingerplate 4a with the fingertip causes the protruding pressing section of the fingerplate 4a to press and activate this "RETURN" switch 15 to carry out the operation of returning to the display of the image displayed one step before on the display screen 3 (FIG. 1). Thus, during a series of operations of browsing a menu in a hierarchic structure, it is possible to carry out operations without taking the finger off the pointing device. Moreover, once the operator places the finger on the pointing device, then the operator can concentrate on the display screen only without looking at the operating finger, which makes the operation easier. In this case, the fingertip is also stopped by the protrusion 16a, which makes it easier to push in the "RETURN" switch 15 of the fingerplate 4a.

By the way, this embodiment also describes the case where the pointer displayed on the display screen 3 is moved continuously or step by step by touching and moving the image pick-up area in the center of the fingerplate 4a with the fingertip (the pointer moves continuously when moving on a map and moves step by step when moving on the screen of a selection item such as a menu screen). Furthermore, the protrusions 16a and 16b are not always necessary.

FIG. 8 is a configuration diagram showing a further embodiment of the pointing device 4 according to the present invention and FIG. 8A is a top view, FIG. 8B is a cross-sectional view and FIG. 8C and FIG. 8D are functional schematic diagrams, and reference numerals 17a and 17b denote rotation axes; 18a to 18d, functional switches; and 19, protrusions. The same parts as those shown in the above-described drawings are assigned the same reference numerals and overlapping explanations thereof will be omitted.

This embodiment describes the pointing device 4 explained in FIG. 2 to FIG. 4 with enhanced multi-functions.

In FIG. 8A and FIG. 8B, four functional switches 18a, 18b, 18c and 18d are spaced uniformly around the through hole 8a of the outer case 8 inside the outer case 8 and protruding pressing sections corresponding to these functional switches 18a, 18b, 18c and 18d are formed on the fingerplate 4a.

Then, the fingerplate 4a is placed by mounting means (not shown) in such a way as to be pivotable on the two axes of the rotation axes 17a and 17b orthogonal, which are perpendicular to each other. Here, the rotation axis 17a is perpendicular to the straight line connecting the functional switches 18c and 18d, while the rotation axis 17b is perpendicular to the straight line connecting the functional switches 18a and 18b. Of course, the mounting means above of the fingerplate 4a is made of a transparent material so as not to prevent the image pick-up element 4c (FIG. 2) from capturing the image on the outer surface of the fingerplate 4a. Furthermore, protrusions 19 are provided toward the functional switches 18a to 18d on the outer surface of the fingerplate 4a. The image pick-up area of the image pick-up element 4c on the outer surface of this fingerplate 4a is the central part between the protrusions 19 on this outer surface.

In this pointing device 4 having such a configuration, the image of the above-described image pick-up area on the outer surface of the fingerplate 4a is taken by the image pick-up element 4c and pressing the functional switch 18a side of this fingerplate 4a with the fingertip causes the fingerplate 4a to incline toward the functional switch 18a and the protruding pressing section of the fingerplate 4a presses and activates the functional switch 18a. In this case, since the protrusion 19 is provided on the functional switch 18a side of the outer surface of the fingerplate 4a, the fingertip is stopped by this protrusion, which makes it easier to push in the functional switch 18a side of the fingerplate 4a. The same applies to other functional switches 18b to 18d sides and it is possible to push in the fingerplate 4a toward these switches and activate these switches. These switches are also provided with their respective protrusions 19, which makes it easier to push in the fingerplate 4a towards these switches.

Here, the functional switches 18a to 18d are provided with predetermined functions. FIG. 8C shows an example of this. Here, the functional switches 18a to 18d are provided with the function of moving the pointer displayed on the display screen 3 (FIG. 1) one step at a time (that is, one item at a time when the menu screen is displayed on the display screen 3). More specifically, explaining this with reference to FIG. 8A, the functional switch 18a is used to move the pointer one step rightward at a time, the functional switch 18b is used to move the pointer one step leftward, the functional switch 18c is used to move the pointer one step upward and the functional switch 18d is used to move the pointer one step downward.

When the function shown in FIG. 8C is provided, touching the image pick-up area in the central part of the fingerplate 4a with the fingertip and moving the fingertip allows the pointer displayed on the display screen 3 to move continuously. The protrusions 19 are not always necessary.

Furthermore, FIG. 8D shows another example of function. The portable information terminal 1 provided with the pointing device 4 with the image pick-up element 4c (FIG. 2) and the display screen 3 can function as a video camera to take pictures of landscapes, etc. using the image pick-up element 4c and store signals of images taken by the image pick-up element 4c in a built-in storage device with an increased volume of storage or in a large-volume storage medium that can be attached to the apparatus and read and replay the image signals on the display screen 3.

In this case, it is possible to provide the replay operation function as shown in FIG. 8D. Explaining this with reference to FIG. 8A, the functional switch 18a is provided with a fast-forward function, the functional switch 18b is provided with a rewind function, the functional switch 18c is provided with a replay/pause function and the functional switch 18d is provided with a stop function.

When the function shown in FIG. 8D is provided, touching the image pick-up area in the central part of the fingerplate 4a with the fingertip and moving the fingertip allows the pointer displayed on the display screen 3 to move continuously or step by step (the pointer moves continuously when moving on a map and moves step by step when moving on the screen of a selection item such as a menu screen). The protrusions 19 are not always necessary.

Figure 9A:
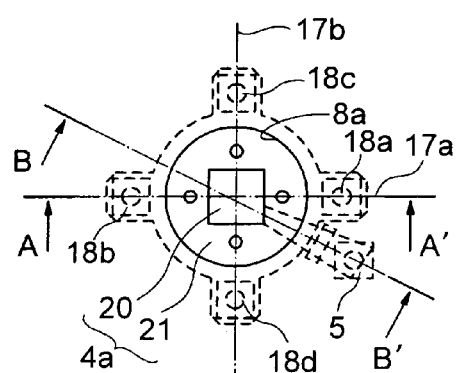
FIGS. 9A, 9B, 9C, 9D are configuration diagrams showing a still further embodiment of the pointing device according to the present invention.
Figure 9D:
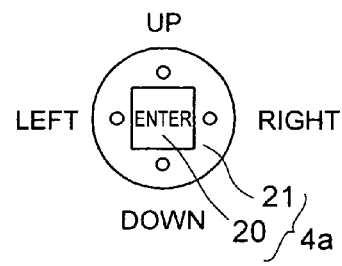
Figure 9B:
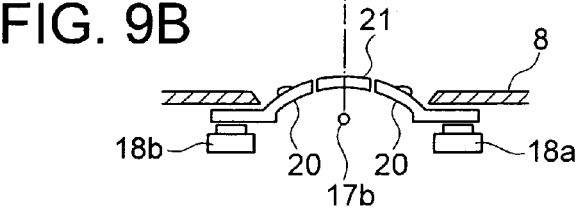
Figure 9C:
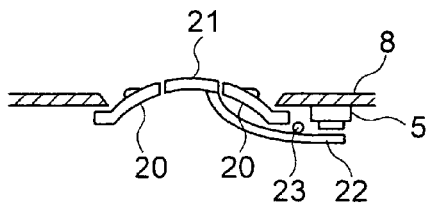

FIG. 9 is a configuration diagram showing another embodiment of the pointing device 4 according to the present invention and FIG. 9A is a top view, FIG. 9B and FIG. 9C are cross-sectional views along a line A–A' and B–B' of FIG. 9A, respectively and FIG. 9D is a functional schematic diagram. Reference numeral 20 denotes an ENTER operation section; 21, a functional operation section; 22, an actuating part; 23, a hinge. The same parts as those in FIG. 8 are assigned the same reference numerals and overlapping explanations thereof will be omitted.

This embodiment is a case where an ENTER operation section is added to the pointing device 4 explained in FIG. 8 to further enhance the multi-functions.

That is, in FIG. 9A to FIG. 9D, the fingerplate 4a is divided into two areas; a central part and a peripheral part and the central part constitutes an ENTER operation section 20 and the peripheral part constitutes a functional operation section 21 to activate the functional switches 18a to 18d. Since this functional operation section 21 is similar to the fingerplate 4a in the embodiment shown in FIG. 8, explanations thereof will be omitted. The ENTER operation section 20 is configured to be able to be pushed in. One end of the actuating part 22, which is supported by a hinge 23 in a pivotable manner, is attached to the inner side of this ENTER operation section 20 and the other end of this actuating part 22 constitutes the operation section of the "ENTER" switch 5 provided on the inner surface of the outer case 8.

Pushing in the ENTER operation section 20 of the fingerplate 4a with the fingertip makes the actuating part 22 rotate centered on the hinge 23 and the operation part at the end of this actuating part 22 acts on the "ENTER" switch 5 and activates it. When the pushing of the ENTER operation section 20 is released, the ENTER operation section 20 returns to its original position by means which is not shown.

By the way, the image pick-up area of the image pick-up element 4c (FIG. 2) is set inside the ENTER operation section 20 in this embodiment, too and touching this image pick-up area with the fingertip and moving the fingertip allows the pointer displayed on the display screen 3 to move continuously.

Figure 10:
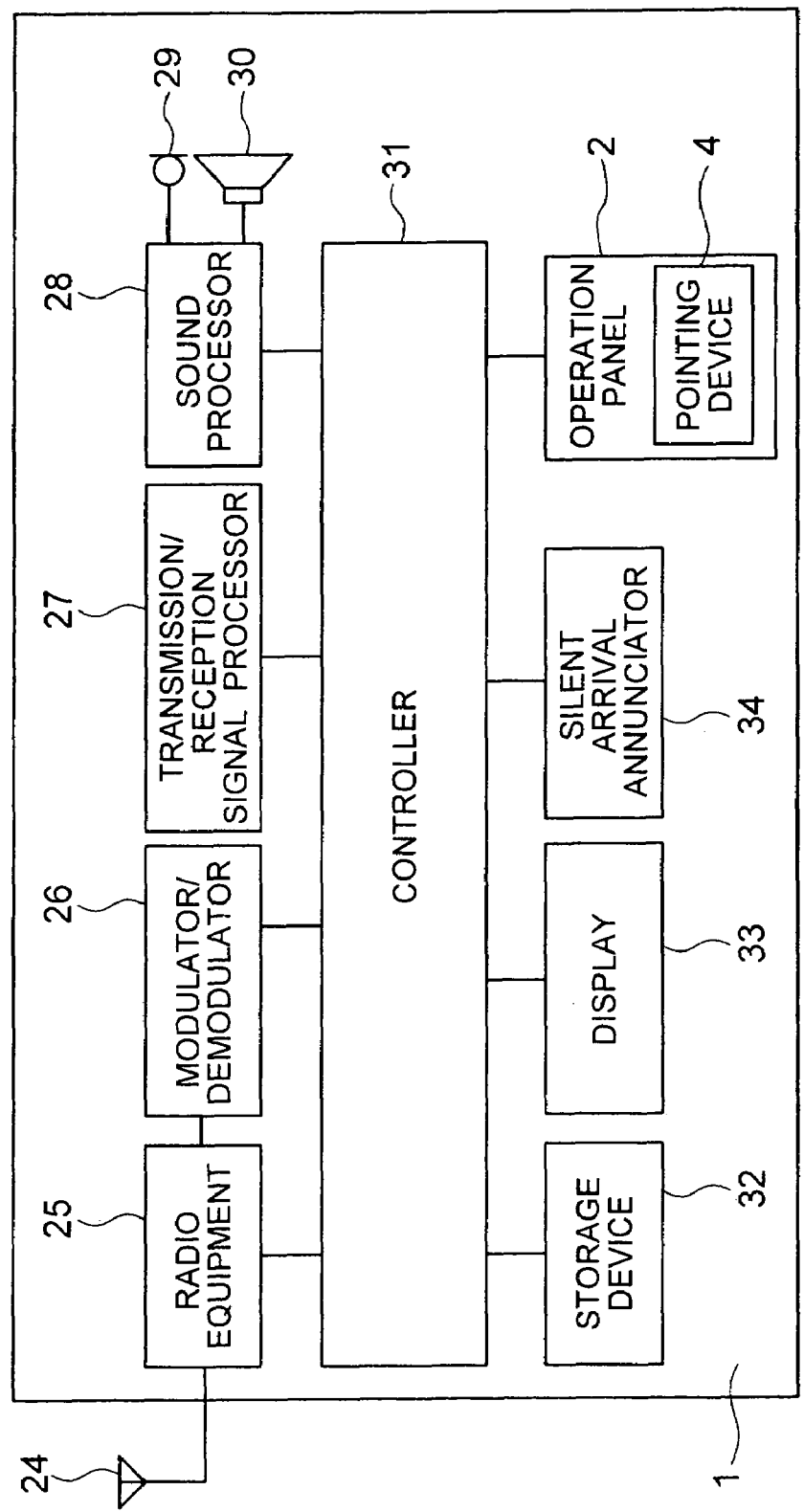
FIG. 10 is a block diagram showing a specific example of the circuit configuration of the embodiment shown in FIG. 1.

FIG. 10 is a block diagram showing a circuit configuration of the portable information terminal 1 shown in FIG. 1 and reference numeral 24 denotes an antenna; 25, radio equipment that transmits/receives a radio signal; 26, a modulator/demodulator that modulates a transmission signal and demodulates a received signal; 27, a transmission/reception signal processor that processes a transmission signal or arriving signal; 28, a sound processor that processes a speech signal from a speech transmitter 29 such as a microphone and a speech signal supplied to a speech receiver 30 such as a speaker; 31, a controller that controls the entire portable information terminal 1; 32, a storage device that stores information from a telephone directory, various set data or information from the Internet; 33, a display that displays images or pointer, etc. on the display screen 3 (FIG. 1); 34, a silent arrival annunciator such as a vibrator that produces vibration to notify the user of arrival of a call and the same parts as those in FIG. 1 are assigned the same reference numerals.

Figure 11A:
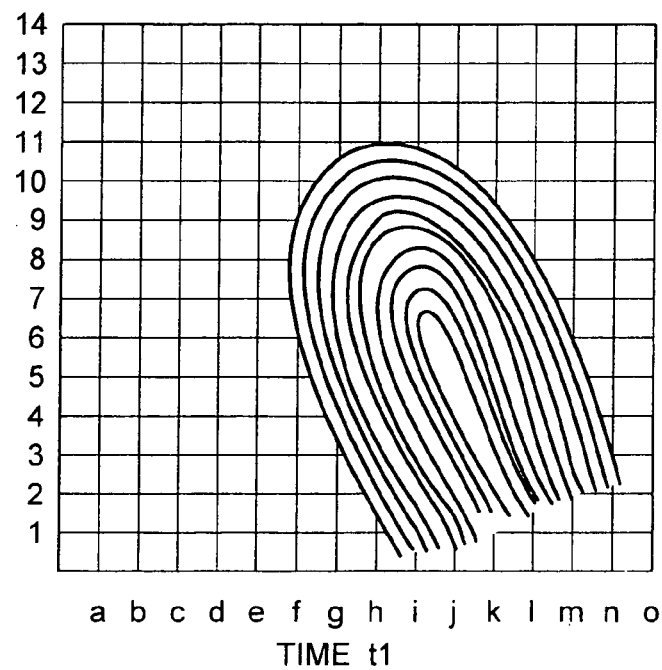
FIGS. 11A, 11B are drawings to explain a method of detecting a variation of an image picked up from the pointing device of a controller in FIG. 10.
Figure 11B:
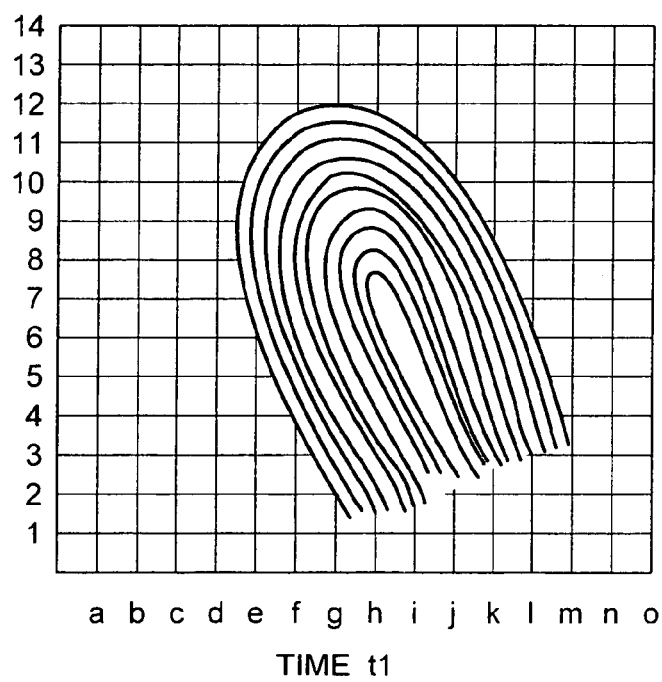

In the same drawing, as explained in FIG. 2, when the pointing device 4 is touched with the fingertip 7, an image of the pattern of the thick 7a thereof, that is, the fingerprint is taken by the image pick-up element 4c and the image signal is supplied to the controller 31. The controller 31 reads image signals from this image pick-up element 4c at predetermined time intervals, compares images of image signals loaded before and after, such as time $t_1$ and time $t_2$ as shown in FIG. 11, detects a change and thereby detects the movement of the fingertip 7 on the pointing device 4. Then, this controller 31 controls the position of the pointer displayed on the display screen 3 (FIG. 1) by the display 33 according to this detection result. When no movement of the fingertip 7 is detected, the controller 31 holds this pointer in a halt state and when any movement of the fingertip 7 is detected, the controller 31 moves the pointer at a speed according to the movement of this fingertip 7 and in the direction according to the direction of the movement of this fingertip 7. Thus, touching the fingerplate 4a of the pointing device 4 with the fingertip 7 and moving this fingertip 7 allows the pointer to move on the display screen 3.

Thus, when the pointer reaches a predetermined position on the display screen 3 (for example, a position at which a predetermined item is displayed), pushing in the fingerplate 4a with the fingertip 7 activates the "ENTER" switch 5 and selects and specifies the position (for example, the predetermined item above).

Furthermore, the controller 31 detects the quantity of light received by the image pick-up element 4c of the pointing device 4 and controls the quantity of light emitted by the light emitting device 4b, etc.

Parts other than those described above are the same as those in the conventional portable information terminal.

On the other hand, when the display 3 in FIG. 2 is large and when the pointer is moved in one direction, if it is impossible to move the pointer to a desired position with a single operation of the fingertip 7, the fingertip 7 must move on the fingerplate 4a repeatedly and the movement of the fingertip 7 at this time is a reciprocating motion. In this case, if this reciprocating motion is performed with the fingertip 7 contacting the fingerplate 4a, the controller 31 (FIG. 10) assumes that the fingertip 7 is performing a reciprocating motion and makes the pointer also perform a reciprocating motion accordingly, which prevents the pointer from moving to a desired position. Therefore, when it is not possible to move the pointer to a desired position without moving the fingertip 7 a plurality of times, it is necessary to take this fingertip 7 off the fingerplate 4a when returning the fingertip 7.

However, this occurs in the case where the display screen 3 is large. However, such a problem does not occur when the display screen 3 is small as in the case of a cellular phone and it is possible to move the pointer from one side of the display screen 3 to the opposite side by a single motion of the fingertip 7 on the fingerplate 4a.

In such a pointing device 4, it is only necessary to take an image of part of the thick 7a of the fingertip 7, that is, it is only necessary to detect a change of the image read by the controller 31 before and after. This makes it possible to reduce the area of the surface of the fingerplate 4a, and hence the size of the fingerplate 4a and as a result, reduce the size of the pointing device 4.

Figure 12:
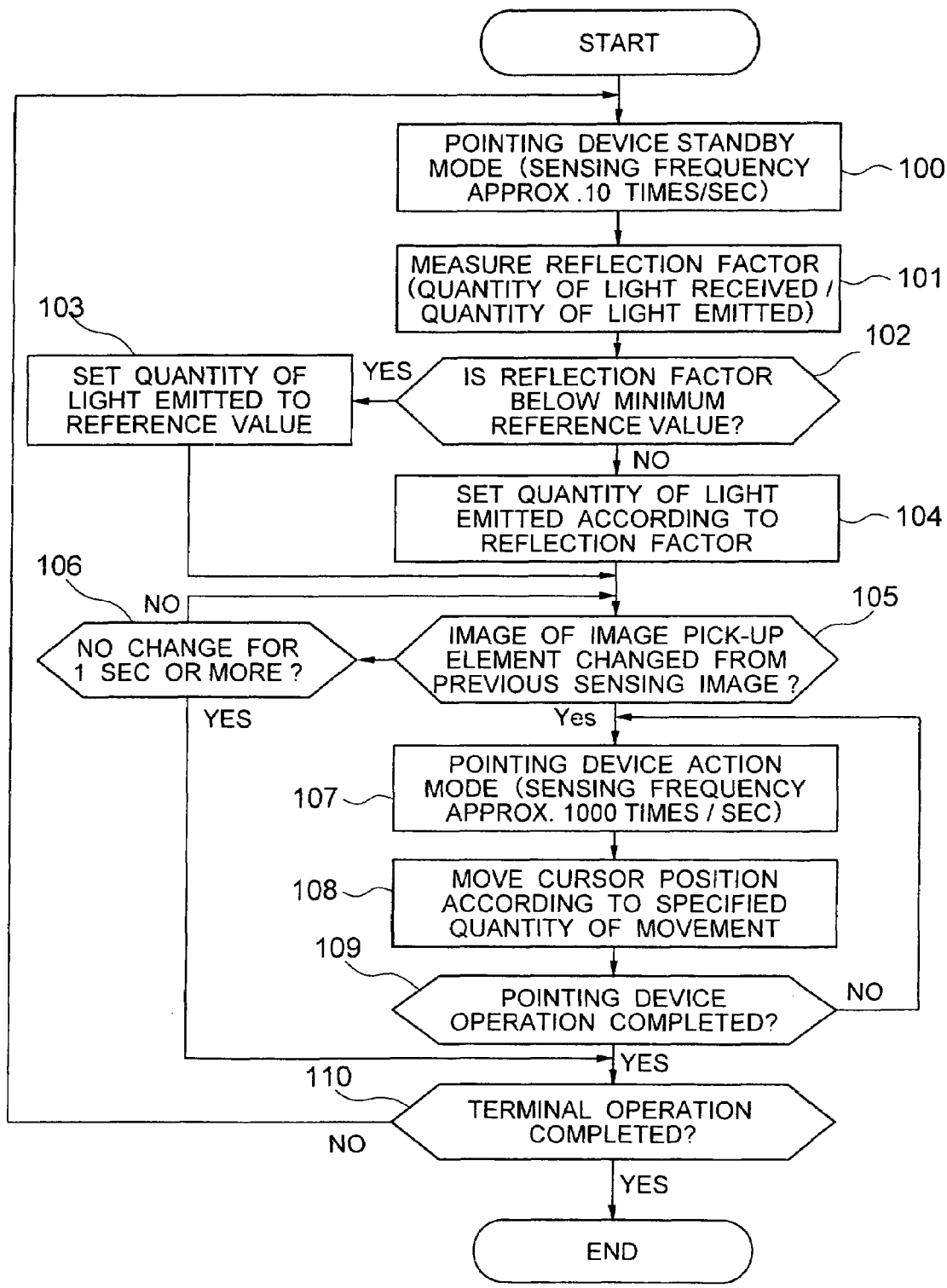
FIG. 12 is a flow chart showing an operation of the pointing device shown in FIG. 2 by the controller in FIG. 10.

FIG. 12 is a flow chart showing a control operation of the pointing device 4 by the controller 31.

In the same drawing, when the "Power/stop call" button 2a is operated on the operation panel 2 of the portable information terminal 1 shown in FIG. 1, power is turned on, or when the pointing device 4 gets ready for operation by opening the cover of the portable information terminal 1 in a configuration described later, or unfolding the folded portable information terminal 1, the pointing device 4 is set in a standby mode (step 100). In this standby mode, the controller 31 makes the light emitting device 4b emit illumination light with a predetermined quantity of light emission and the image pick-up element 4c repeats picture taking with the frequency (sensing frequency) of approximately 10 times a second. When the image pick-up element 4c takes pictures, the quantity of light received by the image pick-up element 4c is detected from the output thereof and the reflection factor (=quantity of light received/quantity of light emitted) on the outer surface of the fingerplate 4a is calculated based on the quantity of light received and the quantity of light emitted of the light emitting device 4b (step 101). The quantity of light received is assumed to be, for example, the integrated value of the output signal value corresponding to one screen from the image pick-up element 4c and the quantity of light emitted of the light emitting device 4b is assumed to be a drive power value of this light emitting device 4b.

Then, this reflection factor calculated is compared with a preset minimum reflection factor (minimum reference value) (step 102). This step 102 is intended to determine whether the fingertip 7, etc. is touching the fingerplate 4a or not and this minimum reference value can be obtained by, for example, an experiment, etc.

Then, if the reflection factor obtained in step 101 is below this minimum reference value, it is determined that the fingertip, etc. is not touching the fingerplate 4a for the operation of moving the pointer on the display screen 3 (hereinafter referred to as "pointer operation") (if the reflection factor is below this minimum reference value, the quantity of light emitted of the light emitting device 4b is temporarily increased and the quantity of light received by the image pick-up element 4c at this time is detected, and if there is almost no change in the quantity of light received even if the quantity of light emitted is increased in this way, it can also be determined that the fingertip, etc. is not touching the fingerplate 4a), the quantity of light emitted of the light emitting device 4b is set to a preset small reference value (step 103) and the process moves on to step 105. This allows power saving in the standby mode. On the other hand, when the reflection factor obtained in step 101 exceeds this minimum reference value, it is determined that the fingertip, etc. is touching the fingerplate 4a for a pointer operation (step 102), the quantity of light emitted of the light emitting device 4b is set to a value according to this reflection factor and the quantity of light received by the image pick-up element 4c is adjusted to a predetermined constant value (step 104). Therefore, if, for example, the reflection factor of an image of the fingertip covered with a glove is low and the quantity of light received is not enough to take the image on the image pick-up surface by the image pick-up element 4c with favorable brightness, the quantity of light emitted of the light emitting device 4b is increased so as to increase the output level of the image pick-up element 4c, or on the contrary, if the reflection factor of the fingertip 7 touching the fingerplate 4a is high and the quantity of light received on the image pick-up surface by the image pick-up element 4c is too much, the quantity of light emitted of the light emitting device 4b is decreased so that the light emitting device 4b does not output the quantity of unnecessary light to save power consumption. After this quantity of light emitted is adjusted, the process moves on to step 105.

In this step 105, the image pick-up element 4c takes pictures with low frequency in a standby mode (that is, sensing frequency is 10 times/sec, etc.), and every time an image is taken, the image pick-up element 4c compares the image with the previous image and detects whether there is any change (movement) of the image. Then, if no change is detected for one sec or more (step 106), unless the "Power/stop call" button 2a (FIG. 1) on the operation panel 2 is operated again and power is turned off (step 110), the process returns to step 100 and detects the reflection factor as shown above and adjusts the quantity of light emitted of the light emitting device 4b. If the "Power/stop call" button 2a on the operation panel 2 is operated and power is turned OFF or the cover is put on the portable information terminal 1 as will be described later and the use of the portable information terminal 1 is completed (step 110), the pointing device 4 is set in a halt state.

Moreover, if there is any change (movement) with the image (step 105), it is judged that the pointer is operated, and the pointing device 4 is changed to an action mode (step 107). In this action mode, the sensing frequency of the image pick-up element 4c is set to a high speed, for example, 1000 times/sec, and this makes smooth the change of the image obtained from the image pick-up element 4c for the movement of the fingertip 7. The controller 31 picks up each image taken and detects a change from the image taken previously and changes the position of the pointer according to the change, that is, the movement of the fingertip 7 (step 108). The operations in step 107 and 108 are repeated as long as such an operation of the pointing device 4 continues (step 109).

In the above action mode, the image pick-up element 4c takes pictures (sensing) with a frequency as high as 1000 times a second, for example, compared to a normal video camera, but since the picture taking range of this image pick-up element 4c is extremely narrow, detection of images can be performed with high resolution even if the number of pixels is set to a small value compared to an image pick-up element used for an ordinary video camera, and this ability to reduce the number of pixels makes it possible to increase the sensing frequency as shown above. On the other hand, increasing the sensing frequency in this way will shorten the time of exposure of each pixel, and by increasing the quantity of light emitted so that the necessary quantity of light is obtained in that short exposure time (this will be done in step 104), the quantity of light received at each pixel increases and an image signal with a sufficient level is obtained from the image pick-up element 4c. Furthermore, it is also possible to use a device such as a light emitting diode that can emit light in pulses and generate a necessary sufficient quantity of light in a short time.

Moreover, in the standby mode above, when the fingertip 7, etc. is not touching the fingerplate 4a, the quantity of light emitted of the light emitting device 4b is reduced (step 103) and the sensing frequency of the image pick-up element 4c is reduced considerably compared to the action mode (step 100), and it is therefore possible to suppress power consumption considerably, and even if the fingertip 7, etc. is touching the fingerplate 4a, the sensing frequency of the image pick-up element 4c is reduced considerably (step 100), which makes it possible to expect suppression of power consumption. When the fingertip 7, etc. touches the fingerplate 4a, however, the fingertip 7 moves and an action mode starts almost immediately in that condition, and therefore, it is rather more important to adjust the quantity of light emitted of the light emitting device 4b (step 104), move the fingertip 7 and transition to the action mode immediately.

Then, when an ENTER operation is performed by pushing in the fingerplate 4a of the pointing device 4 with the fingertip 7 or when the operation of the pointing device 4 is finished by operating the operation switches other than the pointing device 4 (step 109), unless the "Power/stop call" button 2a (FIG. 1) on the operation panel 2 is operated and power is turned OFF or the use of the portable information terminal 1 is finished by putting the cover to the portable information terminal 1, which will be described later (step 110), the process returns to step 100 and starts the operation from there and the pointing device 4 is set in a standby state until it is operated next.

Figure 13A:
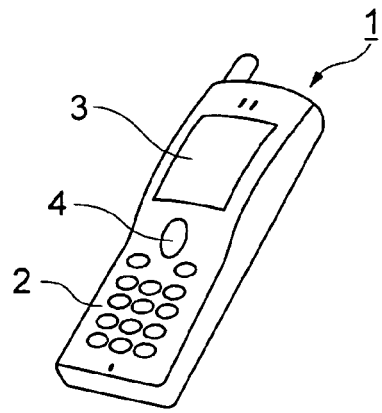
FIGS. 13A, 13B, 13C, 13D, 13E illustrate layout examples of the pointing device according to the present invention on a portable information terminal.
Figure 13B:
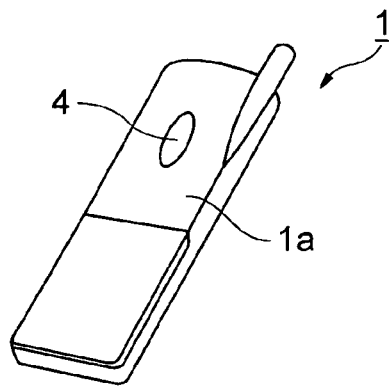
Figure 13C:
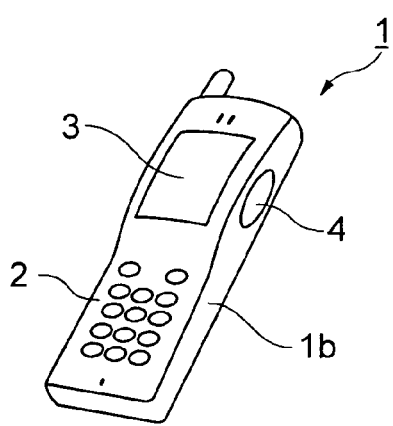
Figure 13D:
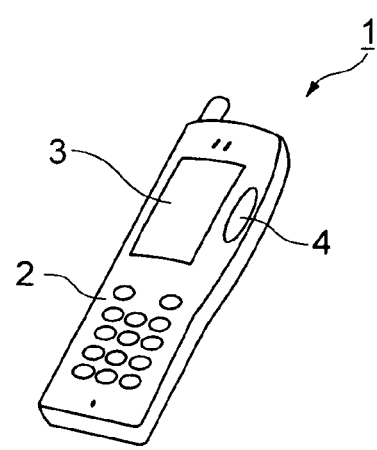
Figure 13E:
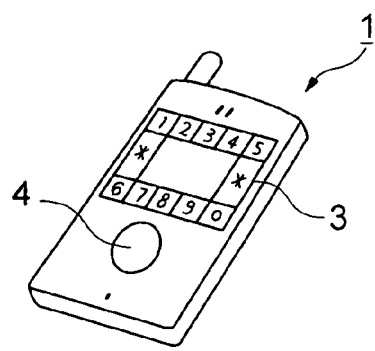

FIG. 13 illustrates layout examples of the pointing device 4 in the embodiment of this portable information terminal 1 and FIG. 13A shows an example of placing the pointing device 4 on the operation panel 2, FIG. 13B shows an example of placing the pointing device 4 on the back 1a of portable information terminal 1, FIG. 13C shows an example of placing the pointing device 4 on one side 1b of the portable information terminal 1 (here, the pointing device 4 is placed on the side 1b, but can also be placed on the opposite side 1b) and FIG. 13D shows an example of placing the pointing device 4 next to the display screen 3. Moreover, a specific example in FIG. 13E shows an embodiment in which numerical keys to enter telephone numbers are eliminated and numbers are entered only through operations of the pointing device. To enter numbers, a number list and a pointer are displayed in the peripheral section of the display screen 3 and it is possible to enter a number by moving the pointer to the number to be entered using the pointing device 4 and performing an ENTER operation. With such a portable information terminal 1, it is also possible to place the pointing device 4 at an appropriate position.

Thus, the pointing device 4 can be placed in any location of the portable information terminal 1 taking into account the ease of operation, etc. For example, in the layout examples shown in FIG. 13B and FIG. 13C, most areas of the back 1a and side 1b of the portable information terminal 1 are not used and placing the pointing device 4 in easy-to-use locations makes it possible to effectively use the surface of the portable information terminal 1, reduce the size of the operation panel and implement a further reduction in size of the portable information terminal 1.

FIG. 14 illustrates layout examples of the pointing device 4 of another embodiment of the portable information terminal 1.

Figure 14A:
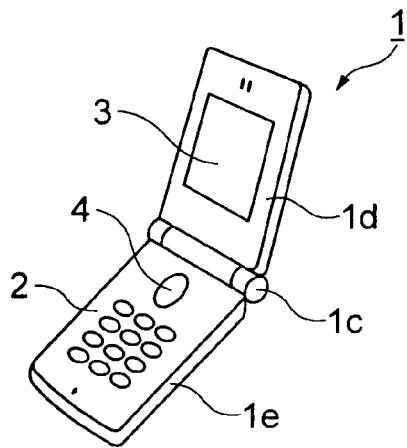
FIGS. 14A, 14B, 14C, 14D, 14E illustrate another layout examples of the pointing device according to the present invention on the portable information terminal.
Figure 14B:
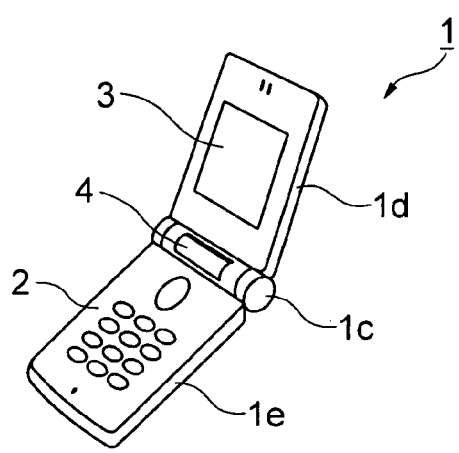
Figure 14C:
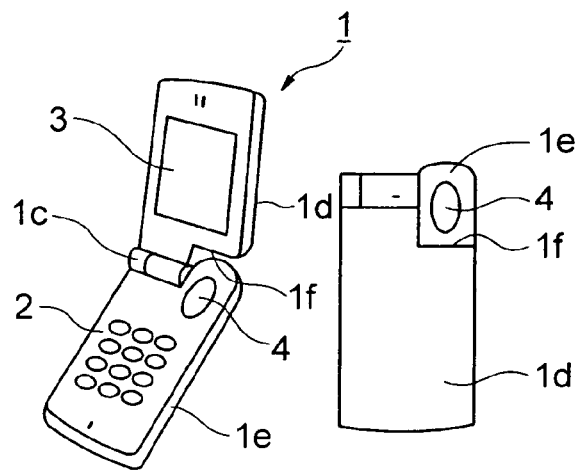

FIG. 14A to FIG. 14C relate to a folding portable information terminal 1 in which a case 1d provided with the display screen 3 is connected with a case 1e having the operation panel 2 in a pivotable manner by a hinge 1c and when the portable information terminal is not used, overlapping the case 1d over the case 1e makes it possible to prevent the display screen 3 and operation panel 2 from exposing to the outside.

In the portable information terminal 1 in such a configuration, the specific example in FIG. 14A shows the pointing device 4 placed on the operation panel 2 and the specific example in FIG. 14B shows the pointing device 4 placed on a hinge 1c. In both specific examples, by placing the pointing device 4 on the operation panel 2, it is possible to protect the pointing device 4 when the portable information terminal 1 is not used.

Moreover, the specific example in FIG. 14C shows a case where the case 1d is provided with a notch section 1f facing the case 1e so that part of the case 1e is exposed to the outside through this notch section 1f also when the terminal is folded and the pointing device 4 is placed in that exposed section. In such a specific example, when the terminal is folded, it is possible to change the function of the pointing device 4 to a function different from the original function (that is, the function of moving the pointer on the display screen 3, that is, pointer operation function) and use the pointing device 4 even when the portable information terminal 1 is folded. Such a function can be a function of display of arrival, etc. allowing the light emitting device 4b of the pointing device 4 (FIG. 2) to emit light when there is an incoming call while the terminal is folded.

Figure 14D:
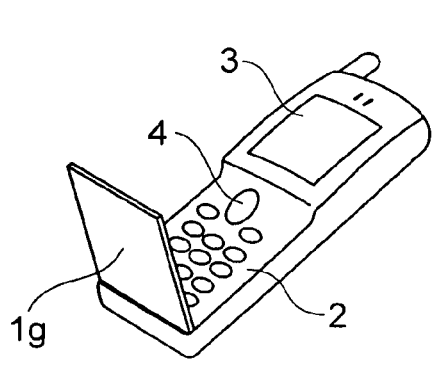
Figure 14E:
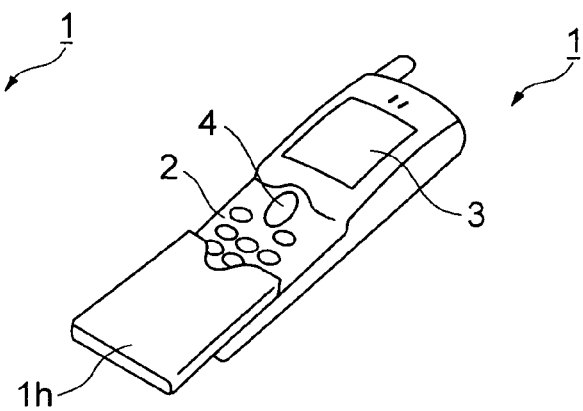

The specific example shown in FIG. 14D shows a case where a flip (open/close cover) 1g is provided on the operation panel 2 and the specific example shown in FIG. 14E shows a case where a slide cover 1h is provided on the operation panel 2. In these specific examples, it is also possible to protect the pointing device 4 when the portable information terminal 1 is not used by placing the pointing device 4 on the operation panel 2.

By the way, in the specific examples in FIG. 14, the pointing device 4 performs the operation shown in FIG. 12 and when the terminal is folded in the specific examples in FIG. 14A to FIG. 14C, or when the covers 1g and 1h are closed in the specific examples in FIG. 14D and FIG. 14E, it is determined in step 110 that the portable information terminal 1 has finished the operation and the pointing device 4 is set in a halt state. Furthermore, when the terminal is unfolded in the specific examples in FIG. 14A to FIG. 14C, or when the covers 1g and 1h are opened in the specific examples in FIG. 14D and FIG. 14E, the pointing device 4 starts to operate in the standby mode in step 100. In this case, it goes without saying that a sensor (not shown) to detect the folding state or the open/closed state of the covers 1g and 1h is provided in each portable information terminal 1 shown in FIG. 14.

As shown above, the pointing device 4 is placed at an appropriate location of the portable information terminal 1, and it goes without saying that the location is the one which allows the user to easily operate the portable information terminal 1 by the thumb or forefinger when the user holds the portable information terminal 1 by hand. Of course, it is also possible to design so that the pointing device 4 is operated with the finger of the hand different from the hand that holds the portable information terminal 1, but it goes without saying that it is more convenient to operate the pointing device 4 with the finger of the hand that holds the portable information terminal 1.

Figure 15:
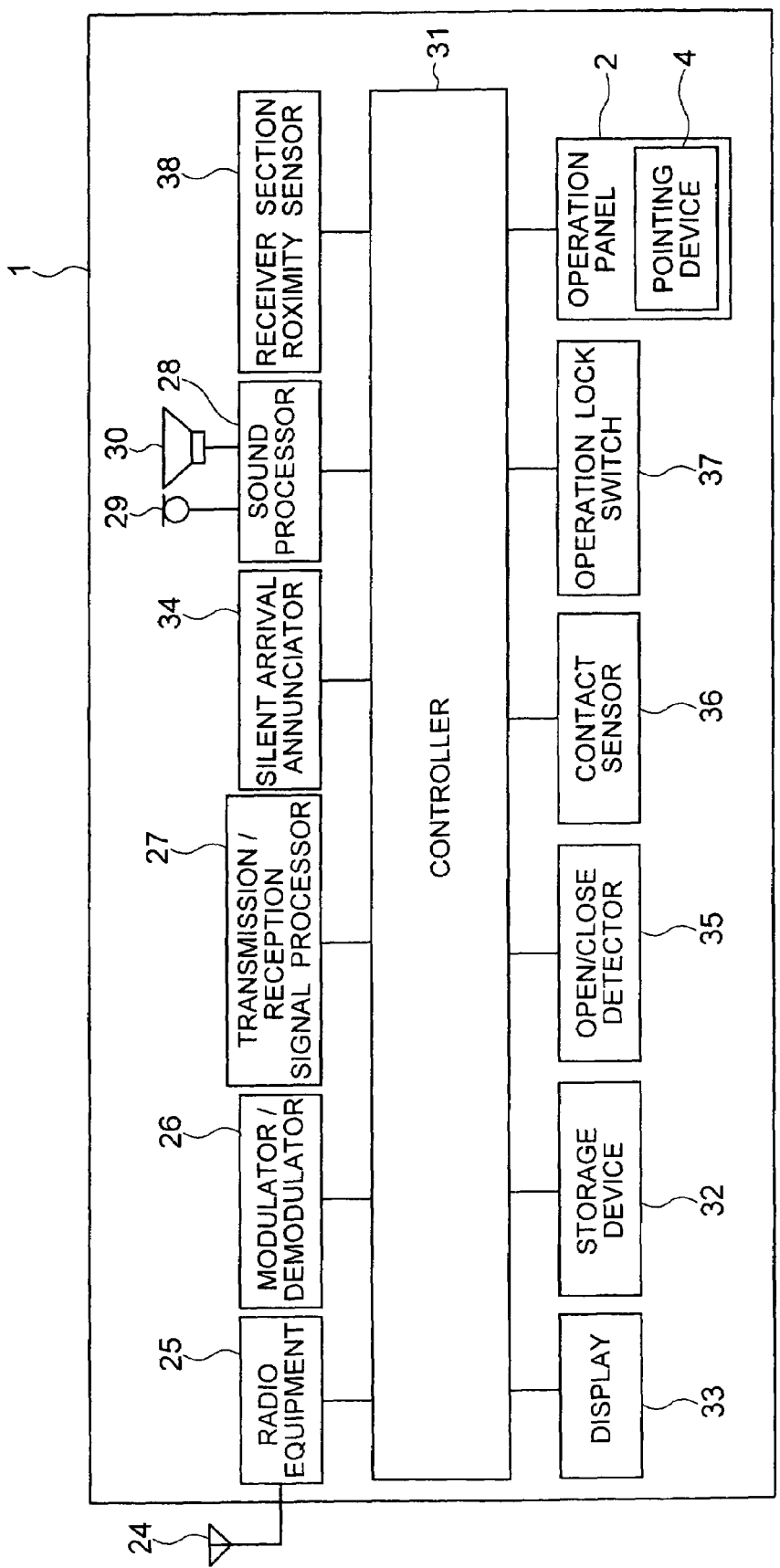
FIG. 15 is a block diagram showing a specific example of a circuit configuration of another embodiment of the portable information terminal according to the present invention.

FIG. 15 is a block diagram showing a circuit configuration of another embodiment of the portable information terminal. Reference numeral 35 denotes an open/close detector; 36, a contact sensor; 37, an operation lock switch; 38, a receiver section proximity sensor, and the same parts as those in FIG. 2 will be assigned the same reference numerals and overlapping explanations thereof will be omitted.

This embodiment in FIG. 15 is the circuit configuration shown in FIG. 2 with all or at least one of the open/close detector 35, contact sensor 36, operation lock switch 37 and receiver section proximity sensor 38.

Figure 16A:
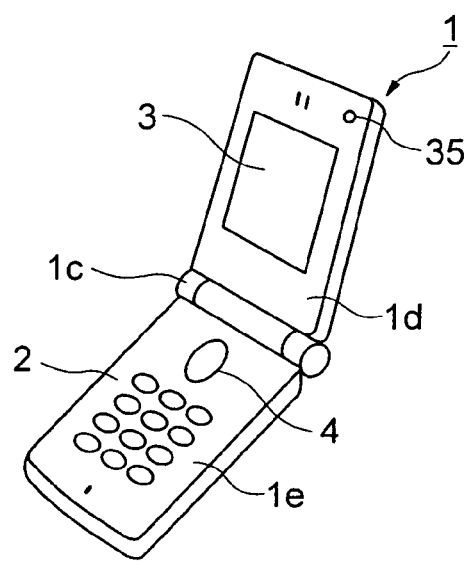
FIGS. 16A, 16B, 16C, 16D illustrate layout examples of an open/close detector, a contact sensor, an operation lock switch, a receiver section proximity sensor shown in FIG. 15 on the portable information terminal.

The open/close detector 35 is provided for the portable information terminal 1 of a folded type or with the cover as shown in FIG. 15. In the case of the folded type portable information terminal 1 as shown in FIG. 16A, the open/close detector 35 is placed on either the surface of the case 1d or 1e (here, the side next to the display screen 3 of the case 1d). This open/close detector 35 can be a push-type switch or optical sensor. When the cases 1d and 1e overlap with each other in a folded state, the open/close detector 35 detects this and supplies this detection output to the controller 31. The controller 31 determines whether the portable information terminal 1 is opened or not in the case of the folded type portable information terminal 1 and whether the cover is opened or closed in the case of the portable information terminal 1 with a cover.

Figure 16B:
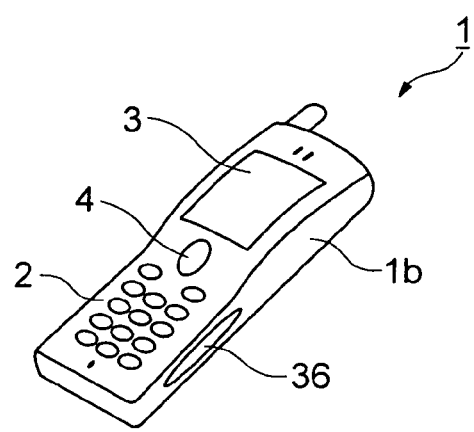

The contact sensor 36 is placed on the side 1b of the portable information terminal 1 to detect whether the palm of the hand of the user touches or not, as shown in FIG. 16B. This detected output is supplied to the controller 31 and the controller 31 determines from this detected output whether the portable information terminal 1 is held by the hand of the user or not. This contact sensor 36 can be placed on one side 1b of the portable information terminal 1 or can also be placed on both sides of the portable information terminal 1.

In order to distinguish the case where the user holds the portable information terminal 1 by hand to operate the terminal from other cases (for example, when the portable information terminal 1 is put in a briefcase in contact with objects around), it is preferable to have the contact sensor 36 of an electrostatic capacitive type capable of distinguishing the human hand from other objects when the sensor is placed on one side 1b or a type of contact sensor 36 using the electrical resistance value of the human hand as a detection reference when the sensor is placed on both sides.

Figure 16C:
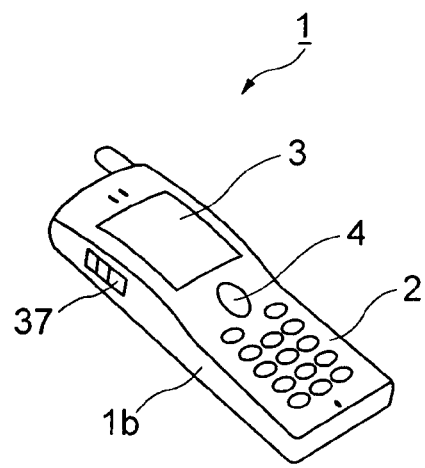

The operation lock switch 37 is provided on one side 1b of the portable information terminal 1 as shown in FIG. 16C and operating the operation lock switch 37 locks the operation switches on the operation panel 2 and pointing device 4 preventing them from operating.

Figure 16D:
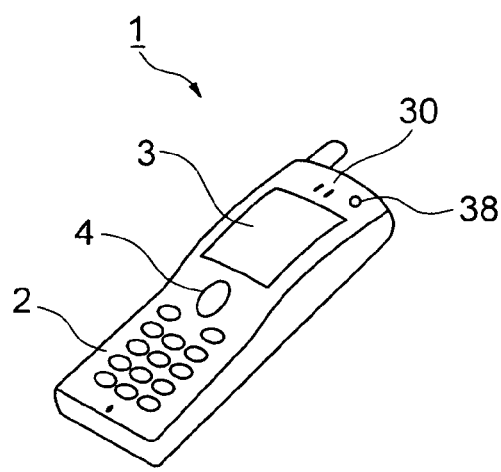

The receiver section proximity sensor 38 is placed close to the location of the sound receiver 30 such as a speaker of the portable information terminal 1 as shown in FIG. 16D to detect any object that approaches this (for example, within a range of 1 cm) and send the detected output to the controller 31. The controller 31 determines from this detected output that the ear of the user approaches the sound receiver 30 and determines that a call is being received.

Figure 17:
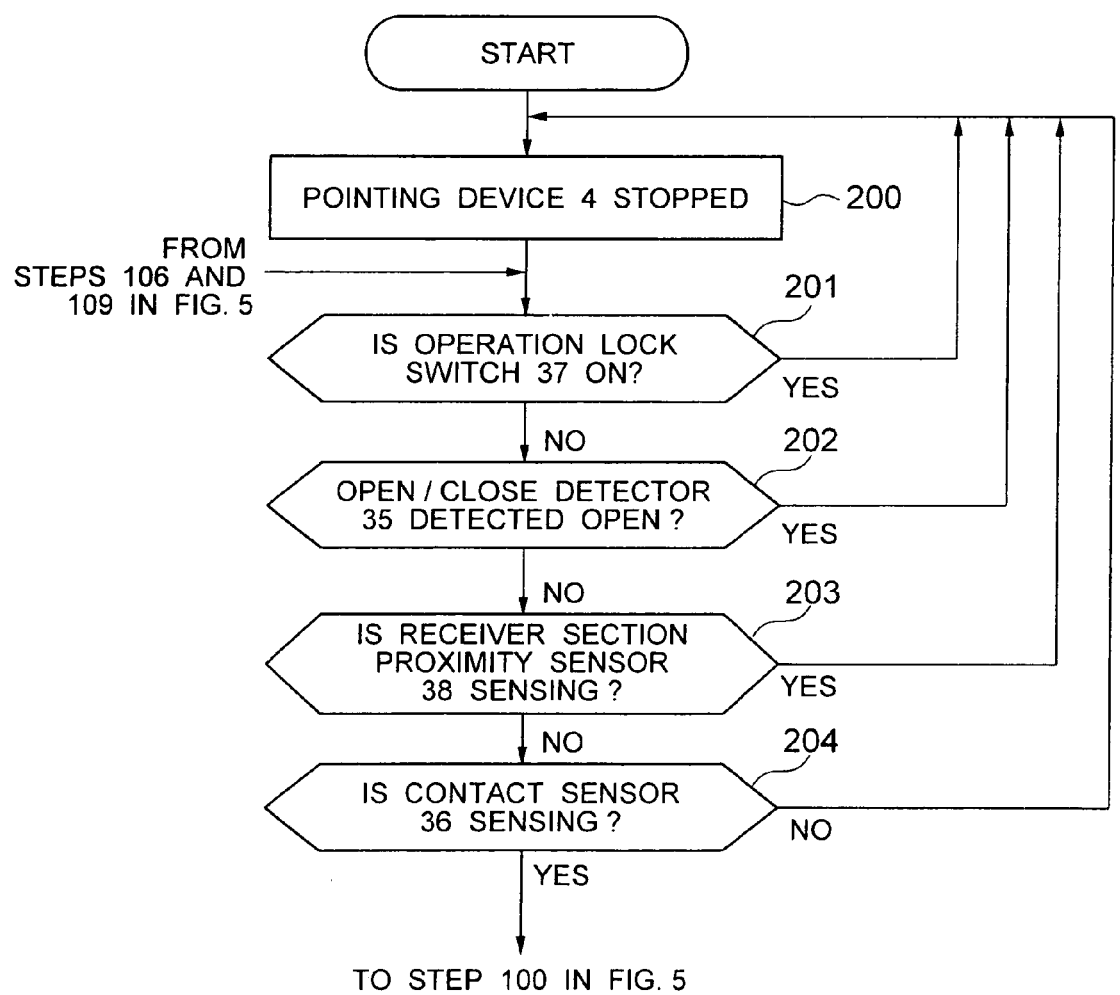
FIG. 17 is a flow chart showing a control operation of the pointing device according to detection outputs of the open/close detector, the contact sensor, the operation lock switch, the receiver section proximity sensor of the controller shown in FIG. 15.

FIG. 17 is a flow chart showing the control operation of the controller 31 in response to detected outputs from the open/close detector 35, contact sensor 36, operation lock switch 37 and receiver section proximity sensor 38. Here, this flow chart will be explained assuming that the portable information terminal 1 is provided with all or some of these open/close detector 35, contact sensor 36, operation lock switch 37 and receiver section proximity sensor 38.

In FIG. 17, in the case of portable information terminal 1 as shown in FIG. 16C, if the operation lock switch 37 is ON (step 201), the operation switches on the operation panel 2 are locked so that they cannot be operated, and at this time the controller 31 sets the pointing device 4 in a halt state (that is, the light emitting device 4b and image pick-up element 4c in FIG. 2 are not operating. Step 200). Furthermore, in the case of the folded type portable information terminal 1 as shown in FIG. 16A, if the cases 1d and 1e overlap with each other in a folded state, the open/close detector 35 is in an open state (step 202) and the controller 31 also sets the pointing device 4 in a halt state (step 200). Furthermore, in the case of the portable information terminal 1 with a receiver section proximity sensor 38 as shown in FIG. 16D, during a conversation, this receiver section proximity sensor 38 supplies a detected output indicating that the user's ear is close to the sound receiver 30 and a conversation is in progress to the controller 31 (step 203) and the controller 31 sets the pointing device 4 in a halt state (step 200). Furthermore, in the case of the portable information terminal 1 with the contact sensor 36 as shown in FIG. 16B, while this contact sensor 36 senses no contacting object (step 204), the controller 31 determines from the detected output from this contact sensor 36 that the portable information terminal 1 is not held by the hand of the user and is not used and sets the pointing device 4 in a halt state (step 200).

In this way, when it is detected in steps 201, 202 and 204 that the portable information terminal 1 is not used, the pointing device 4 is set in a halt state and in this way even if the user touches the fingerplate 4a (FIG. 2) of the pointing device 4 unintentionally, or when the portable information terminal is put in a briefcase or handbag and other objects touch the fingerplate 4a (FIG. 2) of the pointing device 4, the pointing device 4 does not operate, thus making it possible to prevent misoperation of the pointing device 4. This also makes it possible to suppress power consumption of the pointing device 4 and realize power saving.

While the open/close detector 35 is used for a folded type portable information terminal or a portable information terminal 1 provided with a cover as shown in FIG. 14, while the contact sensor 36, operation lock switch 37 or receiver section proximity sensor 38 can be used for any one of the types of portable information terminal 1 shown in FIG. 13 and FIG. 14. Therefore, the portable information terminal 1 can have any one of the open/close detector 35, contact sensor 36 and operation lock switch 37 in combination with the receiver section proximity sensor 38 and in this case, the detection operation in any one of steps 201, 202 and 204 in combination with step 203 is carried out as the operation shown in FIG. 17.

In the case where the detection result in any one of steps 201, 202 and 204 shows that the portable information terminal 1 is ready to be used by the user and at the same time the receiver section proximity sensor 38 detects no approaching object, the operation from step 100 on shown in FIG. 12 is carried out. In the case of "Yes" in steps 106 and 109 in FIG. 12, the process goes back to step 201 in FIG. 17 (this FIG. 17 includes the flow chart shown in FIG. 12, but does not include step 110 in FIG. 12).

FIG. 18 illustrates other specific examples of the misoperation preventing means of the pointing device 4. Reference numeral 39 denotes a crown and the same parts as those in the aforementioned figures will be assigned the same reference numerals and overlapping explanations thereof will be omitted.

Figure 18A:
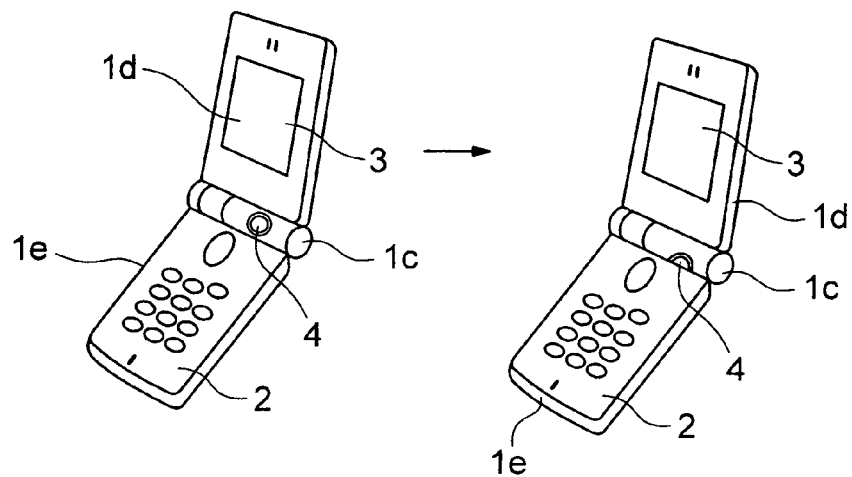
FIGS. 18A, 18B illustrate other specific examples of misoperation preventing means of the pointing device according to the present invention.

FIG. 18A shows a folded type portable information terminal 1 and the pointing device 4 is placed on the hinge 1c that connects the cases 1d and 1e. This hinge 1c can be made pivotable and when the pointing device 4 is operated, the entire pointing device 4 is exposed so that it can be operated as shown in the figure at left and when the pointing device 4 is not used, at least part of the pointing device 4 is hidden as shown in the figure at right.

Of course, the folded type portable information terminal 1 is intended to prevent misoperation of the pointing device 4 by folding the portable information terminal, which is applicable when the portable information terminal 1 is not used. When the portable information terminal 1 is in use, the specific example in FIG. 18A is intended to also prevent misoperation of the pointing device 4 even when the cases 1*d* and 1*e* are completely exposed.

Figure 18B:
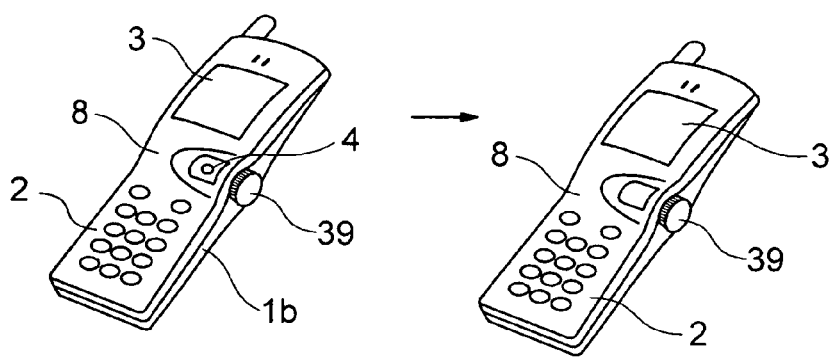

FIG. 18B shows a case of the portable information terminal 1 with the display screen 3 and operation panel 2 exposed all the time. In this case, one end of a rotation axis (not shown) inside the case sticks out of the side 1*b* of the outer case 8 (see FIG. 2) and the crown 39 is attached to it and the pointing device 4 is attached to the other end of this rotation axis within the case. When the pointing device 4 is used, the crown 39 is operated as shown in the figure at left to allow the fingerplate 4*a* to be operated by touching it with the fingertip from the through hole 8*a* provided on the outer case 8 as shown in FIG. 2 and when the pointing device 4 is not used, the fingerplate 4*a* is hidden as shown in the figure at right of FIG. 18B by turning the crown 39 to rotate the pointing device 4.

This makes it possible to prevent misoperation of the pointing device 4 while not in use.

Of course, the means shown in FIG. 18B is also applicable to the portable information terminal 1 with a structure shown in FIG. 14A and 14C to 14E. Of course, in the specific examples shown in FIG. 14A, 14D and 14E, misoperation of the pointing device 4 is prevented by closing the cases 1*d* and 1*e* and closing the covers 1*g* and 1*h*. This is the case where the portable information terminal 1 is not in use and when the portable information terminal 1 is in use, the cases 1*d* and 1*e* are open or covers 1*g* and 1*h* are open and the specific example in FIG. 18B makes it possible to prevent misoperation of the pointing device 4 even in such a case.

Figure 19A:
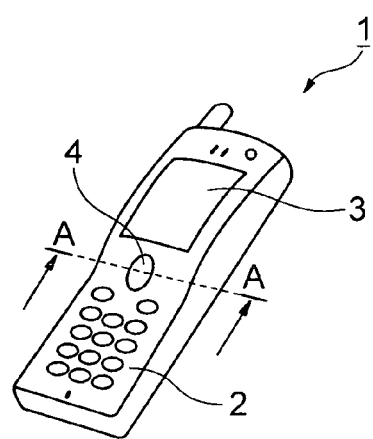
FIGS. 19A, 19B, 19C illustrate further specific examples of the misoperation preventing means of the pointing device according to the present invention.
Figure 19B:
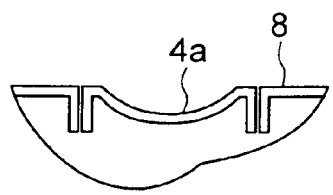
Figure 19C:
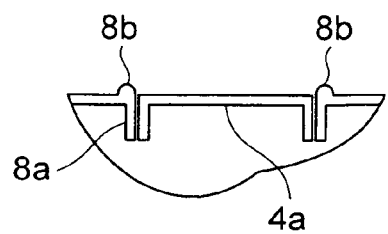

FIG. 19 shows a further specific example of the misoperation preventing means of the pointing device 4. FIG. 19A shows an overall view of the portable information terminal 1, while FIG. 19B and FIG. 19C show sectional views of the fingerplate 4*a* of the pointing device 4 viewed from the split line of FIG. 19A, respectively and the same parts as those in the aforementioned figures will be assigned the same reference numerals and overlapping explanations thereof will be omitted.

The specific example shown in FIG. 19B shows the fingerplate 4*a* of the pointing device 4 having a concave outer surface whose depth is largest in the center. This pointing device 4 has the same configuration as that in FIG. 2 except the fingerplate 4*a* and the condensing lens 4*d* is placed so that the image close to the central part on the concave outer surface of the fingerplate 4*a* converges onto the image pick-up surface of the image pick-up element 4*c*. Then, when the fingerplate 4*a* in the configuration shown in this FIG. 19B is used, if, for example, the portable information terminal 1 is put in a briefcase, even if other objects touch the operation panel 2 of the portable information terminal 1 and move on the pointing device 4, since the surface of these objects is separate from the central section of the outer surface of the fingerplate 4*a*, this surface image on the image pick-up plane of the image pick-up element 4*c* is out of focus and the controller 31 (FIG. 15) cannot detect this surface image (that is, a pattern). For this reason, even if this object moves with respect to the pointing device 4, the controller 31 cannot detect this, cannot move on to step 107 in FIG. 12 after the operation of FIG. 17 or prevent misoperation of the pointing device 4.

The specific example shown in FIG. 19C shows the fingerplate 4*a* of the pointing device 4 having a flat outer surface with protrusion 8*b* provided around the through hole 8*a* of the outer case 8 in which this fingerplate 4*a* is fitted. The circumference of the fingerplate 4*a* is placed lower than this protrusion 8*b*. In this specific example, the rest of the configuration of the pointing device 4 is the same as the configuration in FIG. 2 and the condensing lens 4*d* is placed so that the image on the outer surface of the fingerplate 4*a* converges onto the image pick-up plane of the image pick-up element 4*c*.

According to such a configuration, as in the case of the specific example shown in FIG. 19B, when the portable information terminal 1 is put in a briefcase and even if another object touches the operation panel 2 of the portable information terminal 1 and moves on the pointing device 4, the pointing device 4 does not operate erroneously.

Then, an operation example of the embodiment of the portable information terminal 1 described above will be explained.

FIG. 20 is a flow chart showing an operation procedure when a telephone call is made. When a telephone call is made to a person whose telephone number is registered, operating almost only the pointing device 4 can perform this operation. FIG. 20 shows this case.

FIG. 21 shows screens displayed on the display screen 3 according to this operation. Reference numeral 40 is a pointer (cursor).

Figure 21A:
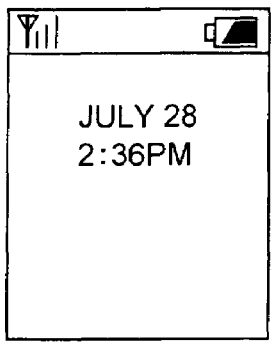
FIGS. 21A, 21B, 21C, 21D, 21E, 21F, 21G illustrate specific examples of screens displayed sequentially on the display screen according to the operation procedure shown in FIG. 20.

In FIG. 1, FIG. 20 and FIG. 21, when power is turned ON by operating the "Power/stop call" button 2*d*, the initial screen appears on the display screen 3 as shown in FIG. 21A. In this state, operating the "Menu" button 2*c* (step 300) shows the menu screen shown in FIG. 21B on the display screen 3. On this menu screen, it is possible to select a menu (selection item) such as "Telephone directory", "Mail", "Map service", "Shopping", and so on. A frame-shaped pointer 40 is also displayed on this screen. This pointer 40 can be moved by touching the aforementioned fingerplate 4*a* of the pointing device 4 with the fingertip and moving the fingertip one step at a time (one selection item at a time) in the direction (that is, upward or downward) according to the movement of the fingertip.

Figure 21E:
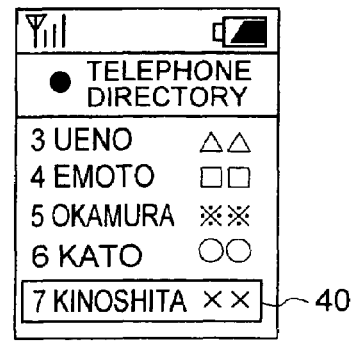
Figure 21B:
Figure 21F:
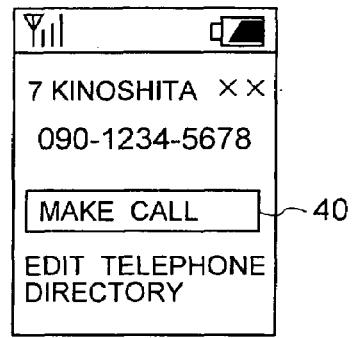
Figure 21C:
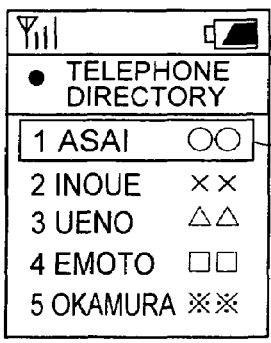

On this menu screen, if an pointer operation is performed in such a way that the pointer 40 is moved to a desired selection item, here, a selection item "Telephone directory" (step 301) and the fingerplate 4*a* of the pointing device 4 is pushed in with the fingertip to perform an ENTER operation (step 302), then the telephone directory screen shown in FIG. 21C is displayed on the display screen 3. This telephone directory screen displays the names of people whose telephone numbers are registered and the pointer 40 to select one of them. Then, by performing a pointer operation using the fingerplate 4*a* of the pointing device 4 (step 303), the pointer 40 is moved on the telephone directory screen to indicate the person to whom a telephone call is made. Here, if the name of the person in question does not appear, the pointer 40 is moved to the end of the telephone directory screen as shown in FIG. 21D, and if the pointer operation is continued in the same direction, this telephone directory screen scrolls (step 304) and the name of the desired person can be displayed. The telephone directory screen shown in FIG. 21E shows this state and this makes it possible to point the pointer 40 to the desired person (here, "Kinoshita XX") (step 305). Then, if the ENTER operation above is performed on the pointing device 4 with the pointer 40 placed on the desired person (step 306), the telephone directory screen changes to the telephone number screen as shown in FIG. 21F showing the telephone number of the selected person, selection item "Make a call", "Edit telephone directory". When a telephone call is made to this person, pointing the pointer 40 to "Make a call" and performing the ENTER operation above using the pointing device 4 (step 307) shows a call screen as shown in FIG. 21G to make a call to the other party (step 308).

Figure 21G:
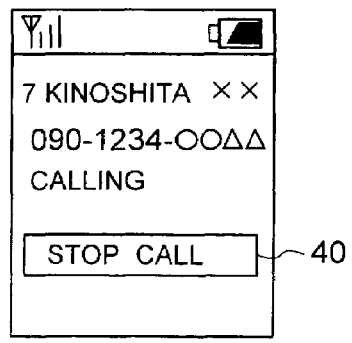
Figure 21D:
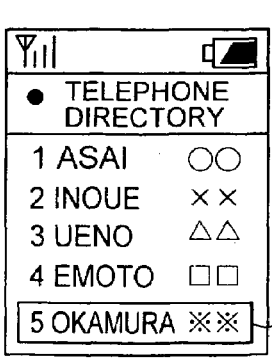

This call screen also displays an item "Stop call" as shown in FIG. 21G and the pointer 40 points to this item. For example, when the other party does not come on the line and the user wants to stop the call, the user may perform the ENTER operation above using the pointing device 4 while the call screen is displayed, then the call is stopped and the initial screen in FIG. 21A is displayed again.

When a call is made while the call screen shown in FIG. 21G is displayed (step 308) and then the other party answers the phone, a conversation starts and the name and telephone number of the other party are displayed on the display screen 3 at that time. When the conversation with the other party ends and the "Power/stop call" button 2a is operated, the initial screen in FIG. 21A is displayed again.

Thus, by operating the pointing device 4, it is possible to call the other end of communication.

When a call is made to a person whose telephone number is not registered, the "Power/stop call" button 2a is operated to display the telephone number input screen as in the case of the conventional art, the telephone number is entered in this input screen by operating the ten-key pad, and then the "Start call" button 2b is pressed, which starts a call to the other party.

Furthermore, operating the "Power/stop call" button 2a in any step of FIG. 20 can return to the initial screen in FIG. 21A and operating the "Return" button 2d on the display screen 3 in any step of FIG. 20 can return to the previously displayed screen.

Figure 22:
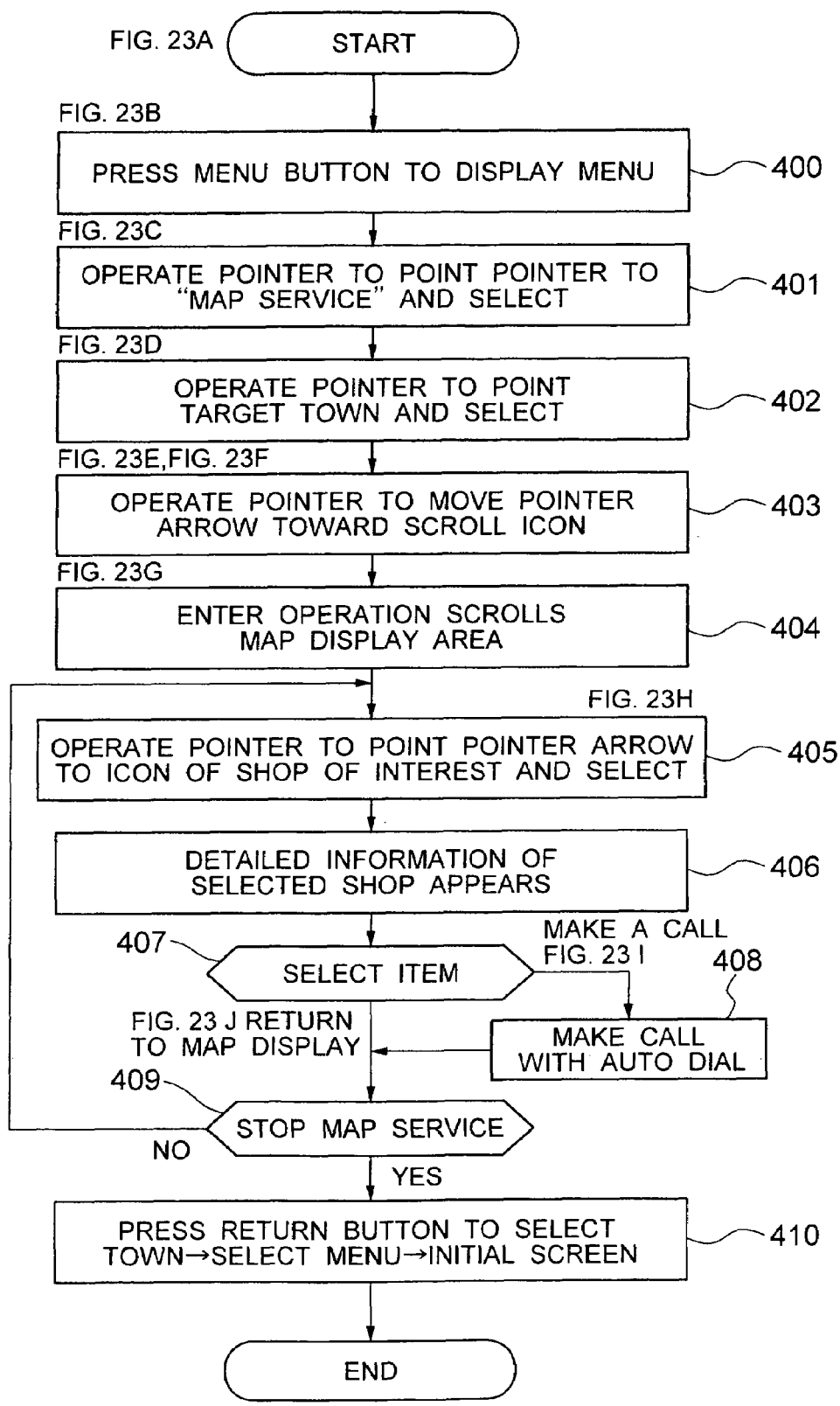
FIG. 22 is a flow chart showing a specific example of the operation procedure for receiving a map service of the embodiment of the portable information terminal according to the present invention.

FIG. 22 is a flow chart showing another operation example in the above embodiment of the portable information terminal according to the present invention, that is, the operation procedure for receiving a map service. FIG. 23 illustrates screens displayed on the display screen 3 according to this operation. Reference numeral 41 denotes a map; 42, a pointer (cursor); 43, scroll icons.

Figure 23A:
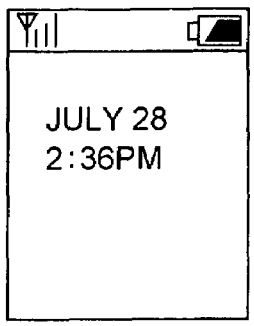
FIGS. 23A, 23B, 23C, 23D, 23E, 23F, 23G, 23H, 23I, 23J illustrate specific examples of the screens displayed sequentially on the display screen shown in FIG. 22.
Figure 23B:
Figure 23C:
Figure 23D:
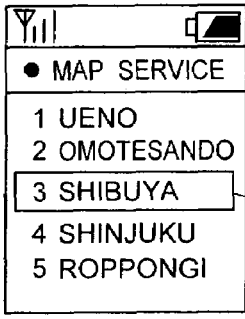

In FIG. 1, FIG. 22 and FIG. 23, step 400 is the same as step 300 in FIG. 20 and operating the "Menu" button 2c while the initial screen in FIG. 23A is displayed on the display screen 3 displays the same menu screen as that shown in FIG. 21B on the display screen 3 as shown in FIG. 23B (step 400). When the pointer is operated on this menu screen and the frameshaped pointer 40 is pointed to a desired selection item, here a selection item "Map service" shown in FIG. 23C and the fingerplate 4a of the pointing device 4 is pushed in with the fingertip to perform an ENTER operation (step 401), then the geographic name selection screen shown in FIG. 23D is displayed on the display screen 3.

Figure 23E:
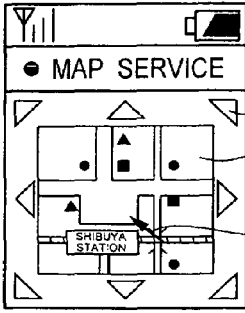

Then, through pointer operation, the pointer 40 is pointed to a target geographic name (here "Shibuya") on this geographic name selection screen and the target geographic name is selected, and the above ENTER operation is performed (step 402), then the selected town as shown in FIG. 23E, that is, the map screen of Shibuya appears. This map screen shows a map 41 of Shibuya selected, an arrow-shaped pointer (cursor) 42 and white triangular scroll icons 43. A total of 8 scroll icons 43 are displayed; four for 4 corners of the map 41, four for midpoints of these icons. These scroll icons 43 indicate the scrolling directions of the map 41 and it is possible to select one of them by the pointer 42.

Figure 23F:
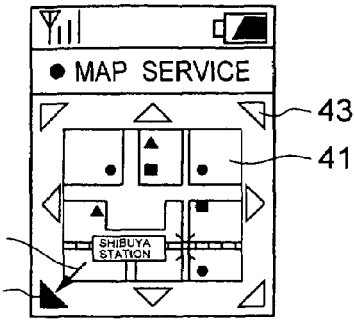
Figure 23G:
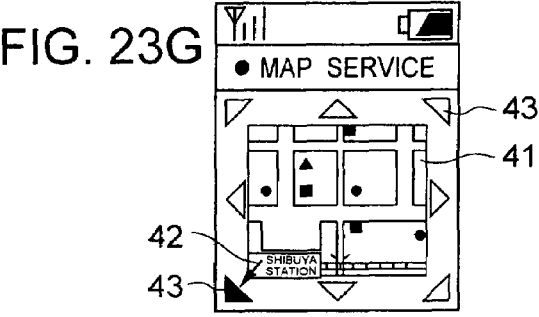

While the map screen shown in FIG. 23E is displayed, through pointer operation using the pointing device 4, the pointer 42 is moved and pointed to the scroll icon 43 indicating a desired scroll direction in the map 41 (step 403), the above ENTER operation is carried out on the pointing device 4, then, the map 41 scrolls in the direction indicated by this scroll icon 43 as shown in FIG. 23G (step 404). In this case, scrolling continues as long as the fingerplate 4a of the pointing device 4 is depressed and when the depressing is finished, the scroll icon 43 selected by the pointer 42 changes to a black triangular shape as shown in FIG. 23F and 23G to define the scroll direction.

Figure 23H:
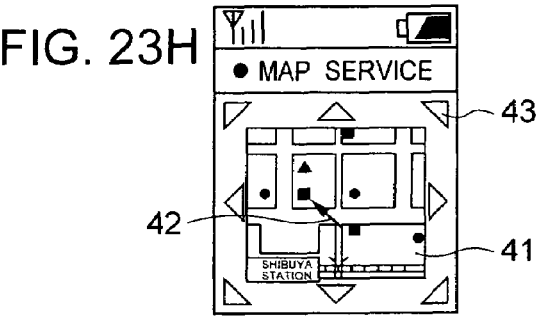

When the scrolling advances and a desired location appears on the map 41, for example, a shop whose information the user wants to see appears, the user stops the ENTER operation and stops scrolling and moves the pointer 42 through pointer operation and when the user points this pointer 42 to the desired location as shown in FIG. 23H and carries out the above ENTER operation (step 405), then the detailed information screen indicating detailed information of the desired location appears on the display screen 3 (step 406).

Figure 23I:
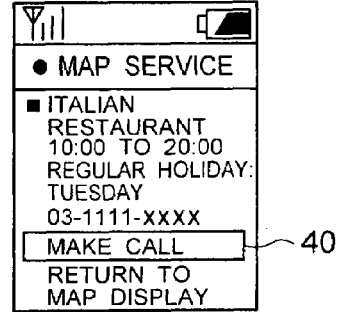
Figure 23J:
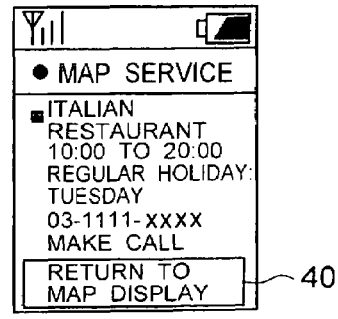

FIG. 23I and FIG. 23J show an example of the detailed information screen schematically. Detailed information of the shop selected in FIG. 23H with the information of interest, for example, the name of the shop (Italian restaurant), service time (10:00 to 20:00), regular holidays (Tuesday), telephone number (03-1111-XXXX) is displayed.

Furthermore, this detailed information screen shows two selection items "Make a call" and "Return to map display" and the frame-shaped pointer 40 and by moving the pointer 40 through pointer operation of the pointing device 4, it is possible to select either one of the selection items (step 407). Then, to make a call to this shop according to the detailed information on this detailed information screen, the user selects the selection item "Make a call" using the pointer 40 and performs the above ENTER operation using the pointing device 4 and thereby a call is automatically made to this telephone (step 408) and when the stop calls and the user operates the "Power/stop call" button 2a, the screen returns to the map screen in FIG. 23H or FIG. 23E. Furthermore, even if the user does not want to make a call to this shop after seeing the detailed information on this detailed information screen, by selecting the selection item "Return to map display" as shown in FIG. 23J using the pointer 40 and performing the above ENTER operation using the pointing device 4, it is possible to return to the map screen shown in FIG. 23H or FIG. 23E. From this display screen, it is possible to carry out operations starting from step 405 to step 403 and re-specify a desired location. If the user wants to stop the map service (step 409), it is possible to return from the map screen to the geographic name selection screen shown in FIG. 23D or the menu screen shown in FIGS. 23B and 23D or the initial screen shown in FIG. 23A by operating the "Return" button 2d.

By the way, by operating the "Power/stop call" button 2a in the display condition of each step except the case where the line is busy in step 408, it is possible to directly display the initial screen in FIG. 23A. When the line is busy in step 408, by operating the "Power/stop call" button 2a, the call finishes and the above-described map screen is displayed but by operating the "Power/stop call" button 2a again, the initial screen in FIG. 23A is displayed directly.

In such a "Map service", through the control of the controller 31 (FIG. 10, FIG. 15), the arrow-shaped pointer 42 displayed on the map 41 moves continuously according to the pointer operation of the pointing device 4. This makes it possible to specify precisely the desired location on the map 41. Furthermore, on the screen on which selection items are shown, the frame-shaped pointer 40 is displayed, but this pointer 40 moves step by step under the control of the controller 31. This makes it possible to select a desired selection item smoothly without the need for fine positional adjustment of the pointer 40. In this way, while using the same pointer operation method using the pointing device 4, the present invention can automatically change the mode of moving the pointer according to the type of the screen displayed and allow the pointer to move in a manner that fits each screen.

FIG. 24 shows sectional views showing further embodiments of the pointing device 4 used for the above-described embodiments of the portable information terminal according to the present invention. Reference numerals $4d_1$, $4d_2$ and $4d_3$ denote condensing lenses; 4g, a lens replacement mechanism; 4h, a lens zooming mechanism, and the same parts as those in the aforementioned figures are assigned the same reference numerals and overlapping explanations will be omitted.

Since each embodiment above of the portable information terminal 1 is provided with an image pickup element 4c, this embodiment also provides this image pick-up element 4c with the function of a digital camera or video camera.

Figure 24A:
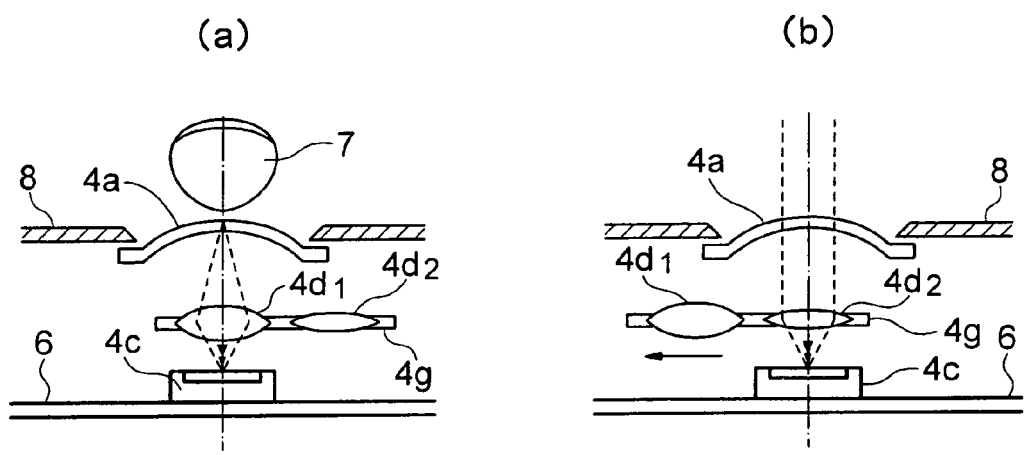
FIGS. 24A, 24B are cross-sectional views showing a specific example of the pointing device when the embodiment of the portable information terminal according to the present invention is provided with a video camera function.

The embodiment shown in FIG. 24A is intended to allow the lens replacement mechanism 4g to switch between the condensing lenses $4d_1$ and $4d_2$ and the condensing lens $4d_1$ is a lens for pointer operation with a short focal distance and the condensing lens $4d_2$ is a lens for picture taking such as landscapes with a long focal distance. The lens replacement mechanism 4g consists of a slide plate or rotation plate and the condensing lenses $4d_1$ and $4d_2$ are mounted on this slide plate or rotation plate. Furthermore, the lens replacement mechanism 4g is also provided with an operation section to operate the lens replacement mechanism 4g associated with the operation panel 2 or the side 1b of the main unit shown in FIG. 1, etc.

FIG. 24A (a) shows a status of pointer operation in which the condensing lens $4d_1$ with a short focal distance is placed between the fingerplate 4a and image pick-up element 4c. When the portable information terminal 1 is used as a video camera, the lens replacement mechanism 4g is slid or rotated so that the condensing lens $4d_2$ with a long focal distance is placed between the fingerplate 4a and image pick-up element 4c as shown in FIG. 24A (b).

Figure 24B:
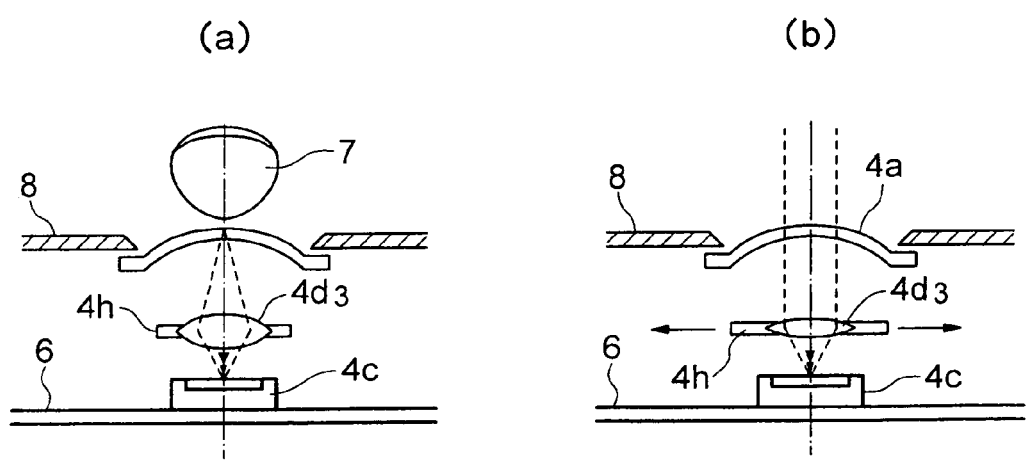

The embodiment shown in FIG. 24B is a case where the condensing lens $4d_3$ with a variable focal distance is used. This condensing lens $4d_3$ is a lens that can expand/contract in the direction perpendicular to the optical axis and the lens zooming mechanism 4h can change the thickness of the condensing lens $4d_3$ by applying uniform forces in the radial direction at a plurality of points evenly spaced on the circumference of the lens simultaneously or releasing the forces and thereby change the focal distance of the condensing lens $4d_3$. This changes the focal distance of the condensing lens $4d_3$. For such a lens zooming mechanism 4h, for example, an aperture mechanism used for a camera can be used.

FIG. 24B (a) shows a status of pointer operation in which the condensing lens $4d_3$ is thick and has a sufficiently short focal distance. When the portable information terminal 1 is used as a video camera, the lens zooming mechanism 4h functions so that the condensing lens $4d_3$ becomes a lens with a long focal distance as shown in FIG. 24B (b).

The same applies to a case where the portable information terminal 1 is used as a digital camera.

By the way, in such an embodiment having also the function as a digital camera or video camera, the display panel 2 of the portable information terminal 1 is provided with a video camera operation button, recording or replay button (for a replay operation, the pointing device 4 can also be provided with the function as shown in FIG. 8D) and when the portable information terminal 1 is used as a video camera, in FIG. 10 and FIG. 15, the controller 31 instructs a processing circuit (not shown) to process the output signal of this image pick-up element 4c as appropriate, record the output signal in an external recording medium (not shown) such as the storage device 32 or a floppy disk, perform a replay operation and thereby display the reproduced image on the display screen 3.

Furthermore, in order to make the portable information terminal 1 function as a digital camera or video camera as shown above, an image pick-up element normally used for a digital camera or video camera is used as the image pick-up element 4c. When the pointing device 4 is used for pointer operations using this image pick-up element 4c as in the case of the embodiment above, part of the picture taking plane of the image pick-up element 4c is used as a scanning target and images are detected with high sensing frequency as shown above. Furthermore, when the portable information terminal 1 is used as a digital camera or video camera as shown above, the entire picture taking plane of the image pick-up element 4c is used as the scanning target. The scanning area used for such a picture taking plane can be changed by, for example, changing the cycle and amplitude of the scan signal used for the image pick-up element 4c.

As described above, the pointing device and the portable information terminal using the same according to the present invention can move the pointer displayed on the display screen according to the movement of images on the outer surface of the plate detected by the image detecting means, and therefore when the user touches the plate with the fingertip and moves the fingertip, the fingerprint of this fingertip is detected as a moving image and the pointer moves on the display screen in the direction according to the direction of this movement. Therefore, it is not necessary to operate different operation switches according to the direction in which the pointer moves, which makes operations easier. Moreover, since it is only necessary to detect the movement of the image on the plate, it is possible to narrow the range of image detection and reduce the size of the pointing device.

The portable information terminal according to the present invention determines the presence or absence of movement of an image on the outer surface of the plate detected by the image detecting means and switches the sensing frequency of the image detecting means according to the determination result, and therefore when there is no movement of the image on the outer surface of the plate and the pointer is not moved, it is possible to reduce the sensing frequency of the image detecting means and suppress power consumption of this image detecting means accordingly.

Furthermore, the pointing device and portable information terminal using the same according to the present invention is further provided with light emitting means for irradiating the outer surface of the plate with illumination light, first means for measuring a reflection factor of the plate on the outer surface from the quantity of light received of the image detecting means and the quantity of light received of the light emitting means, second means for designating the quantity of light emitted of the light emitting means as a first predetermined reference value when the reflection factor measured by the first means falls below a predetermined minimum reference value and adjusting the quantity of light emitted of the light emitting means when the reflection factor measured by the first means exceeds the minimum reference value so that the quantity of light received by the image detecting means becomes a predetermined second reference value which is larger than the first reference value, third means for detecting the movement of the image detected by the image detecting means and moving the pointer in the direction according to the direction of the detected movement and fourth means for determining the presence/absence of movement of the image detected by the image detecting means, setting the pointing device in an action mode when the movement is detected, moving the pointer in the direction according to the direction of the movement and setting the pointing device in a standby mode when no movement is detected for a predetermined period of time, wherein the sensing frequency of the pointing device in the standby mode is smaller than the sensing frequency of the pointing device in the action mode and the second means changes temporarily the quantity of light emitted of the light emitting means when the reflection factor measured by the first means falls below a predetermined minimum reference value and designates the quantity of light emitted of the light emitting means as the predetermined first reference value when the quantity of light received of the image detecting means does not change as the quantity of light emitted changes, and since the light emitting means illuminates the image on the outer surface of the plate, the image detecting means can detect an image of high brightness and when no pointer movement operation is carried out without touching the outer surface of the plate with the fingertip, etc., this can be detected, which can suppress the quantity of light emission by the light emitting means in the standby mode, thus realizing power saving. Moreover, whether the fingertip, etc. is touching the outer surface of the plate or not is judged from the reflection factor of the image on the outer surface of the plate and a variation of the quantity of light received of the image detecting means is detected by temporarily changing the quantity of light emitted of the light emitting means, and therefore whether the fingertip, etc. is touching the outer surface of the plate or not can be judged more accurately.

Furthermore, the portable information terminal according to the present invention allows the pointing device to push in the plate and is provided with at least one operation switch that operates in accordance with this pushing operation and one of these operation switches is designated as an "ENTER" switch to determine the menu on the display screen which is pointed by the pointer. This allows the pointing device to have multi-functions, makes it possible to reduce the number of operation switches on the operation panel of the portable information terminal, further reduce the size of the portable information terminal, and add new operation switches, thus further enhancing the multi-functions of the portable information terminal. The operator can perform a series of selection/determination operations without casting the eyes aside from the pointing device (or without moving a large distance).

Furthermore, the portable information terminal according to the present invention is configured so that the optical means of the pointing device can change the focal distance of the condensing lens allowing the optical means to also have the functions as a digital camera or a video camera.

What is claimed is:

1. A pointing device for moving a pointer shown on a display screen, comprising;

a transparent plate, capable of pushing operation, and having an outer surface which permits contact by a surface of an object;

at least one operation switch that operates according to said pushing operation of said transparent plate;

image detecting means for detecting an image of the surface of said object that contacts said outer surface of said transparent plate;

optical means for forming an image on the outer surface of said transparent plate on a detection plane of said image detecting means;

light emitting means for emitting light onto the outer surface of said transparent plate; and control means for detecting a change in said image detected by said image detecting image for moving said pointer in a direction according to the detected change of said image, wherein said at least one operation switch is configured to be able to activate an operation in accordance with said pushing operation of said transparent plate.

2. A pointing device according to claim 1, wherein said control means judges a presence/absence of movement of the image on the outer surface of said plate detected by said image detecting means and switching a sensing frequency of said image detecting means according to the determination result.

3. A pointing device comprising:

a transparent plate having an outer surface which permits contact by a surface of an object;

image detecting means for detecting an image of the surface of said object that contacts said outer surface of said plate;

optical means for forming an image on the outer surface of said plate on a detection plane of said image detecting means, wherein said pointer is configured to be able to move according to a movement of the image on the outer surface of said plate detected by said image detecting means;

light emitting means for emitting light onto the outer surface of said transparent plate;

first means for measuring a reflection factor of said plate on the outer surface from the quantity of light received by said image detecting means and the quantity of light emitted by said light emitting means;

second means for designating a quantity of light emitted by said light emitting means as a first reference value when the reflection factor measured by said first means falls below a predetermined minimum reference value and adjusting the quantity of light emitted by said light emitting means when the reflection factor measured by said first means exceeds said minimum reference value so that the quantity of light received by said image detecting means becomes a predetermined second reference value which is larger than said first reference value;

third means for detecting a movement of said image detected by said image detecting means and moving said pointer in the direction according to the direction of said detected movement; and fourth means for determining a presence/absence of movement of said image detected by said image detecting means, setting said pointing device in an action mode when said movement is detected, moving said pointer in the direction according to the direction of said movement and setting said pointing device in a standby mode when said movement is not detected for a predetermined period of time, wherein the sensing frequency of said pointing device in said standby mode is smaller than the sensing frequency of said pointing device in said action mode.

4. The pointing device according to claim 3, wherein said second means temporarily changes a quantity of light emitted of said light emitting means when the reflection factor measured by said first means falls below a predetermined minimum reference value and designates the quantity of light emitted of said light emitting means as the predetermined first reference value when the quantity of light received of said image detecting means does not change as said quantity of light emitted changes.

5. The pointing device according to claim 4, wherein said plate of said pointing device allows a pushing operation and comprises at least one operation switch that operates in accordance with said pushing operation.

6. A portable information terminal comprising the pointing device according to claim 5, wherein one of said at least one operation switch is an "Enter" switch to enter a menu on a display screen of said portable information terminal indicated by said pointer device.

7. The portable information terminal according to claim 6, wherein optical means of said pointing device is a first condensing lens that forms an image on the outer surface of said plate on the detection plane of said image detecting means, and wherein said image detecting means is an image pick-up element, and there are provided:

a second condensing lens with a focal distance different from that of said first condensing lens, and means for switching between said first and second condensing lenses so as to insert one of said lenses between said plate and said image pick-up element, and wherein said image pick-up element is configured to be able to pick up images of an object by said second condensing lens at a greater distance than the outer surface of said plate.

8. The portable information terminal according to claim 6, wherein said optical means of said pointing device is a condensing lens capable of switching between a first focal distance at which the image on the outer surface of said transparent plate is formed on the detection plane of said image detecting means and a second focal distance longer than said first focal distance, and wherein said image detecting means is an image pick-up element and is configured to be able to pick up the image of an object by said image pick-up element at a longer distance than the outer surface of said plate by setting the focal distance of said condensing lens to said second focal distance.

9. The pointing device according to claim 3, further comprising:

at least one operation switch that operates according to a pushing operation of said transparent plate, wherein one of said at least one operation switch is an "Enter" switch to enter a menu on a display screen indicated by said pointer.

10. The pointing device according to claim 3, wherein said optical means is a first condensing lens that forms an image on the outer surface of said plate on the detection plane of said image detecting means, wherein said image detecting means is an image pick-up element, and there are provided:

a second condensing lens with a focal distance different from that of said first condensing lens, and means for switching between said first and second condensing lenses and inserting between said plate and said image pick-up element, wherein said image pick-up element is configured to be able to pick up images of an object by said second condensing lens at a greater distance than the outer surface of said plate.

11. The pointing device according to claim 3, wherein said optical means is a condensing lens capable of switching between a first focal distance at which the image on the outer surface of said plate is formed on the detection plane of said image detecting means and a second focal distance longer than said first focal distance, and wherein said image detecting means is an image pick-up element and is configured to be able to pick up the image of an object by said image pick-up element at a longer distance than the outer surface of said plate by setting the focal distance of said condensing lens to said second focal distance.

* * * * *